(12) United States Patent
Jeong

(10) Patent No.: US 7,567,436 B2
(45) Date of Patent: Jul. 28, 2009

(54) MONITOR

(75) Inventor: Jun-soo Jeong, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/671,605

(22) Filed: Sep. 29, 2003

(65) Prior Publication Data
US 2005/0002159 A1    Jan. 6, 2005

(30) Foreign Application Priority Data
Sep. 28, 2002    (KR)    ............... 10-2002-0059208

(51) Int. Cl.
*G06F 1/16* (2006.01)
(52) U.S. Cl. .................... 361/681; 248/917; 16/221
(58) Field of Classification Search ......... 361/379–683; 248/917–924; 16/221
See application file for complete search history.

(56) References Cited

U.S. PATENT DOCUMENTS

| | | | |
|---|---|---|---|
| 2,041,370 A | 5/1936 | Vear | |
| 2,042,443 A | 5/1936 | Buckstone | 248/411 |
| 2,628,142 A | 2/1953 | Ema | |
| 2,890,010 A | 6/1959 | Barkheimer | |
| 3,285,207 A | 11/1966 | Vom Hagen | 108/146 |
| 3,434,684 A | 3/1969 | Warden | |
| 3,788,587 A | 1/1974 | Stemmler | |
| 4,113,215 A | 9/1978 | Stapleton | |
| 4,166,522 A | 9/1979 | Bourcier de Carbon | |
| 4,235,405 A | 11/1980 | Carey | |
| 4,329,800 A | 5/1982 | Shuman | |
| 4,339,104 A | 7/1982 | Weidman | |
| 4,395,010 A | 7/1983 | Helgeland et al. | |
| 4,438,458 A | 3/1984 | Münscher | |
| 4,447,031 A | 5/1984 | Souder, Jr. et al. | |
| 4,601,246 A | 7/1986 | Damico | |
| 4,616,218 A | 10/1986 | Bailey et al. | |

(Continued)

FOREIGN PATENT DOCUMENTS

CN    1031010 C    2/1996

(Continued)

OTHER PUBLICATIONS

U.S. Appl. No. 10/694,029, filed Oct. 2003, Nam-il Cho.

(Continued)

*Primary Examiner*—Jayprakash N Gandhi
*Assistant Examiner*—Anthony Q Edwards
(74) *Attorney, Agent, or Firm*—Staas & Halsey LLP

(57) ABSTRACT

A monitor includes a monitor main body displaying a picture thereon, a base member supporting the monitor main body, a lower link member rotatably combined to a base hinge provided in the base member, an upper link member rotatably combined to a monitor hinge provided in the monitor main body, a link hinge provided between the upper link member and the lower link member and allowing the upper link member to rotate relative to the lower link member, and a first auxiliary link member disposed parallel to the lower link member at a position deviated from axes of the link hinge and the base hinge to connect the lower link member with the upper link member and transmit a rotary motion from the lower link member relative to the base member to the upper link member.

39 Claims, 17 Drawing Sheets

U.S. PATENT DOCUMENTS

| | | | |
|---|---|---|---|
| 4,669,694 A | 6/1987 | Malick | |
| 4,690,362 A | 9/1987 | Helgeland | |
| 4,691,886 A | 9/1987 | Wedling et al. | |
| 4,729,533 A | 3/1988 | Hillary et al. | |
| D295,415 S | 4/1988 | Thies et al. | |
| 4,768,744 A | 9/1988 | Leeds et al. | |
| 4,777,750 A | 10/1988 | Garfinkle | |
| 4,834,329 A * | 5/1989 | Delapp | 248/183.3 |
| 4,846,434 A | 7/1989 | Krogsrud | |
| 4,859,092 A | 8/1989 | Makita | |
| 4,864,601 A | 9/1989 | Berry | |
| 4,924,931 A | 5/1990 | Miller | |
| D313,405 S | 1/1991 | Barry et al. | |
| 4,989,813 A | 2/1991 | Kim et al. | |
| 5,012,852 A | 5/1991 | Blackhurst | |
| 5,088,676 A | 2/1992 | Orchard et al. | |
| 5,102,084 A | 4/1992 | Park | |
| 5,107,402 A | 4/1992 | Malgouires | |
| 5,112,019 A | 5/1992 | Melzler et al. | |
| 5,144,290 A | 9/1992 | Honda et al. | |
| 5,163,652 A | 11/1992 | King | |
| 5,206,790 A | 4/1993 | Thomas et al. | |
| D337,104 S | 7/1993 | Orchard | |
| D349,489 S | 8/1994 | Wang | |
| 5,335,142 A | 8/1994 | Anderson | |
| 5,383,138 A | 1/1995 | Motoyama et al. | |
| 5,422,951 A * | 6/1995 | Takahashi et al. | 379/454 |
| 5,437,236 A | 8/1995 | Zeiner | |
| 5,549,264 A | 8/1996 | West | |
| 5,634,537 A | 6/1997 | Thorn | 188/300 |
| 5,713,549 A | 2/1998 | Shieh | |
| 5,751,548 A | 5/1998 | Hall et al. | |
| 5,758,849 A | 6/1998 | Bui et al. | |
| 5,771,152 A | 6/1998 | Crompton et al. | |
| 5,799,917 A | 9/1998 | Li | |
| 5,812,368 A | 9/1998 | Chen et al. | |
| 5,835,342 A | 11/1998 | Hunte | |
| 5,876,008 A | 3/1999 | Sweere et al. | |
| 5,894,633 A | 4/1999 | Kaneko | |
| 5,911,523 A | 6/1999 | Burchart | |
| 5,924,665 A | 7/1999 | Sweere et al. | |
| 5,941,493 A | 8/1999 | Cheng | |
| 5,947,429 A | 9/1999 | Sweere et al. | |
| 5,975,472 A | 11/1999 | Hung | |
| 5,992,809 A | 11/1999 | Sweere et al. | |
| 5,997,493 A | 12/1999 | Young | |
| 6,012,693 A | 1/2000 | Voeller et al. | |
| 6,015,120 A | 1/2000 | Sweere et al. | |
| 6,018,847 A | 2/2000 | Lu | |
| 6,031,714 A | 2/2000 | Ma | |
| 6,056,248 A | 5/2000 | Ma | |
| 6,062,148 A | 5/2000 | Hodge et al. | |
| 6,064,373 A | 5/2000 | Ditzik | |
| 6,081,420 A | 6/2000 | Kim et al. | |
| 6,113,046 A | 9/2000 | Wang | |
| 6,116,690 A | 9/2000 | Larson | |
| 6,125,507 A | 10/2000 | Katoh | |
| 6,134,103 A | 10/2000 | Ghanma | |
| 6,145,797 A | 11/2000 | Uehara | |
| 6,164,611 A | 12/2000 | Kuhnke | |
| 6,168,124 B1 | 1/2001 | Matsuoka et al. | |
| 6,189,842 B1 | 2/2001 | Bergeron Gull et al. | |
| 6,189,849 B1 | 2/2001 | Sweere et al. | |
| 6,189,850 B1 | 2/2001 | Liao et al. | |
| 6,231,021 B1 | 5/2001 | Hong | |
| 6,233,138 B1 | 5/2001 | Osgood | |
| 6,270,047 B1 | 8/2001 | Hudson | |
| 6,276,655 B1 | 8/2001 | Byoun | |
| 6,266,794 B1 | 9/2001 | Harbin | |
| 6,288,891 B1 | 9/2001 | Hasegawa et al. | |
| 6,305,659 B1 | 10/2001 | Metelski | |
| 6,326,955 B1 | 12/2001 | Ditzik | |
| 6,347,433 B1 | 2/2002 | Novin et al. | |
| 6,352,226 B1 | 3/2002 | Gordon | |
| 6,367,756 B1 | 4/2002 | Wang | |
| 6,378,830 B1 | 4/2002 | Lu | |
| 6,381,125 B1 | 4/2002 | Mizoguchi et al. | |
| 6,390,433 B1 | 5/2002 | Kasa-Djukic | |
| 6,394,403 B1 | 5/2002 | Hung | |
| 6,397,761 B1 | 6/2002 | Moore | |
| 6,402,109 B1 * | 6/2002 | Dittmer | 248/284.1 |
| 6,409,134 B1 | 6/2002 | Oddsen, Jr. | |
| 6,419,196 B1 | 7/2002 | Sweere et al. | |
| 6,430,038 B1 | 8/2002 | Helot et al. | |
| 6,478,275 B1 | 11/2002 | Huang | |
| 6,494,150 B1 | 12/2002 | Phoenix et al. | |
| 6,499,704 B2 | 12/2002 | Oddsen, Jr. | |
| 6,502,792 B1 | 1/2003 | Cho et al. | |
| 6,517,040 B1 | 2/2003 | Wen | |
| 6,522,530 B2 | 2/2003 | Bang | |
| 6,532,628 B2 | 3/2003 | Kim | |
| 6,585,201 B1 | 7/2003 | Reed | |
| 6,592,090 B1 | 7/2003 | Li | |
| 6,601,810 B2 | 8/2003 | Lee | |
| 6,609,272 B1 | 8/2003 | Lee | |
| 6,609,686 B2 | 8/2003 | Malizia | |
| 6,672,533 B1 | 1/2004 | Lin | |
| 6,680,843 B2 | 1/2004 | Farrow et al. | |
| 6,695,266 B1 | 2/2004 | Tsai | |
| 6,695,274 B1 | 2/2004 | Chiu | |
| 6,698,063 B2 | 3/2004 | Kim et al. | |
| 6,702,238 B1 | 3/2004 | Wang | |
| 6,708,940 B2 | 3/2004 | Ligertwood | |
| 6,712,321 B1 | 3/2004 | Su et al. | |
| D489,370 S * | 5/2004 | Jobs et al. | D14/371 |
| 6,766,994 B2 | 7/2004 | Serbinski et al. | |
| 6,769,657 B1 | 8/2004 | Huang | |
| 6,796,541 B2 | 9/2004 | Lu | |
| 6,819,550 B2 * | 11/2004 | Jobs et al. | 361/683 |
| 6,822,857 B2 | 11/2004 | Jung et al. | |
| 6,837,469 B2 | 1/2005 | Wu et al. | |
| 6,857,610 B1 | 2/2005 | Conner et al. | |
| 6,874,743 B2 | 4/2005 | Watanabe et al. | |
| 6,889,958 B2 | 5/2005 | Hoffend, Jr. | |
| 6,905,099 B2 | 6/2005 | Sung | |
| 6,954,221 B2 | 10/2005 | Wu | |
| 7,055,218 B2 | 6/2006 | Lu et al. | |
| 7,168,665 B2 | 1/2007 | Hong et al. | |
| 7,177,144 B2 | 2/2007 | Ha et al. | |
| 7,195,214 B2 | 3/2007 | Lee et al. | |
| 7,237,755 B2 | 7/2007 | Cho et al. | |
| 7,274,555 B2 | 9/2007 | Kim et al. | |
| 2001/0017761 A1 | 8/2001 | Ditzik | |
| 2002/0011544 A1 | 1/2002 | Bosson | |
| 2002/0020792 A1 | 2/2002 | Lee | |
| 2002/0130981 A1 | 9/2002 | Ma et al. | |
| 2003/0075649 A1 | 4/2003 | Jeong et al. | |
| 2003/0075653 A1 | 4/2003 | Li | |
| 2003/0080949 A1 | 5/2003 | Ditzik | |
| 2003/0086240 A1 | 5/2003 | Jobs et al. | |
| 2003/0132360 A1 | 7/2003 | Ju | |
| 2003/0142474 A1 | 7/2003 | Karidis et al. | |
| 2004/0011932 A1 | 1/2004 | Duff | |
| 2004/0056161 A1 | 3/2004 | Ishizaki et al. | |
| 2004/0057197 A1 * | 3/2004 | Hill et al. | 361/683 |
| 2004/0084585 A1 | 5/2004 | Watanabe et al. | |
| 2004/0084588 A1 | 5/2004 | Liu et al. | |
| 2004/0118984 A1 | 6/2004 | Kim et al. | |
| 2006/0176655 A1 * | 8/2006 | Hillman et al. | 361/683 |

FOREIGN PATENT DOCUMENTS

| | | |
|---|---|---|
| CN | 2504675 | 8/2002 |
| DE | 2847135 | 5/1980 |

| | | | | | | |
|---|---|---|---|---|---|---|
| DE | 39 43 137 A1 | 8/1991 | | JP | 11-338576 | 12/1999 |
| DE | 200 09 691 | 11/2000 | | JP | 2000-019981 | 1/2000 |
| DE | 4214341 A1 | 7/2003 | | JP | 2000-56695 | 2/2000 |
| EP | 0 046 225 | 2/1982 | | JP | 3068198 | 2/2000 |
| EP | 244 566 | 11/1987 | | JP | 200056695 | 2/2000 |
| EP | 631 174 B1 | 4/1998 | | JP | 2000-122561 | 4/2000 |
| EP | 1085753 | 3/2001 | | JP | 2000-206893 | 7/2000 |
| GB | 2 206 464 | 1/1989 | | JP | 2000-206901 | 7/2000 |
| JP | 57-151990 | 9/1982 | | JP | 2000-242363 | 9/2000 |
| JP | 61-99873 | 5/1986 | | JP | 3073553 | 9/2000 |
| JP | 61-99874 | 5/1986 | | JP | 200242363 | 9/2000 |
| JP | 61-196314 | 8/1986 | | JP | 2000267581 | 9/2000 |
| JP | 62-96681 | 5/1987 | | JP | 2001-50244 | 2/2001 |
| JP | 62-96682 | 6/1987 | | JP | 2001-075486 | 3/2001 |
| JP | 62-239677 | 10/1987 | | JP | 2001-142407 | 5/2001 |
| JP | 01-273086 | 10/1989 | | JP | 2001142407 | 5/2001 |
| JP | 1-273086 | 10/1989 | | JP | 2001-202026 | 7/2001 |
| JP | 2-58783 | 4/1990 | | JP | 2001-241427 | 9/2001 |
| JP | 2-215408 | 8/1990 | | JP | 20026990 | 1/2002 |
| JP | 02-215408 | 8/1990 | | KR | 1989-3755 | 6/1989 |
| JP | 03-2381 | 1/1991 | | KR | 88-3444 | 10/1989 |
| JP | 03-29800 | 3/1991 | | KR | 1989-20328 | 10/1989 |
| JP | 3-29800 | 3/1991 | | KR | 1991-0009310 | 5/1991 |
| JP | 3-095586 | 4/1991 | | KR | 19910009310 | 5/1991 |
| JP | 3-113423 | 11/1991 | | KR | 114350 | 11/1997 |
| JP | 03-113423 | 11/1991 | | KR | 1997-63717 | 12/1997 |
| JP | 03-114875 | 11/1991 | | KR | 20-1998-0004698 | 3/1998 |
| JP | 3-114875 | 11/1991 | | KR | 1998-4698 | 3/1998 |
| JP | 04-15680 | 1/1992 | | KR | 163133 | 9/1998 |
| JP | 4-15680 | 1/1992 | | KR | 1998-54989 | 12/1998 |
| JP | 04-33073 | 3/1992 | | KR | 1999-40596 | 6/1999 |
| JP | 4-33073 | 3/1992 | | KR | 1999-0040596 | 6/1999 |
| JP | 4-81182 | 3/1992 | | KR | 1999-0073869 | 10/1999 |
| JP | 04-81182 | 3/1992 | | KR | 1999-0075223 | 10/1999 |
| JP | 4-107284 | 4/1992 | | KR | 20-168389 | 11/1999 |
| JP | 4-155375 | 5/1992 | | KR | 168389 | 11/1999 |
| JP | 04-155375 | 5/1992 | | KR | 2000-722 | 1/2000 |
| JP | 04-198979 | 7/1992 | | KR | 2000-725 | 1/2000 |
| JP | 4-198979 | 7/1992 | | KR | 2000-827 | 1/2000 |
| JP | 3-017022 | 9/1992 | | KR | 20-182808 | 3/2000 |
| JP | 03-017022 | 9/1992 | | KR | 20-184275 | 3/2000 |
| JP | 4-132517 | 12/1992 | | KR | 20-0178710 | 4/2000 |
| JP | 05-36523 | 2/1993 | | KR | 20-0191805 | 8/2000 |
| JP | 5-36523 | 2/1993 | | KR | 20-215332 | 12/2000 |
| JP | 5-23576 | 3/1993 | | KR | 2000-73608 | 12/2000 |
| JP | 1993-23576 | 3/1993 | | KR | 2000-0074849 | 12/2000 |
| JP | 05-097098 | 4/1993 | | KR | 10-0289438 | 2/2001 |
| JP | 5-097098 | 4/1993 | | KR | 2002-5136 | 2/2001 |
| JP | 05-36423 | 5/1993 | | KR | 20-227925 | 4/2001 |
| JP | 5-36423 | 5/1993 | | KR | 20-227953 | 4/2001 |
| JP | 05-36523 | 5/1993 | | KR | 2001-0035722 | 5/2001 |
| JP | 5-188865 | 7/1993 | | KR | 20-0227925 | 6/2001 |
| JP | 05-66715 | 9/1993 | | KR | 20-239991 | 7/2001 |
| JP | 6-4778 | 1/1994 | | KR | 2001-53963 | 7/2001 |
| JP | 64778 | 1/1994 | | KR | 2001-56960 | 7/2001 |
| JP | 6-37912 | 2/1994 | | KR | 2001-83865 | 9/2001 |
| JP | 06-37912 | 2/1994 | | KR | 20-251611 | 10/2001 |
| JP | 6-21079 | 3/1994 | | KR | 20-0253576 | 11/2001 |
| JP | 6-118880 | 4/1994 | | KR | 20-0256013 | 11/2001 |
| JP | 06-37912 | 5/1994 | | KR | 20-256809 | 11/2001 |
| JP | 8-121009 | 5/1996 | | KR | 20-259625 | 12/2001 |
| JP | 08-121009 | 5/1996 | | KR | 20002-5136 | 1/2002 |
| JP | 08-234672 | 9/1996 | | KR | 2002-29616 | 4/2002 |
| JP | 8-234672 | 9/1996 | | KR | 2002-0029616 | 4/2002 |
| JP | 8-319753 | 12/1996 | | KR | 20-279427 | 6/2002 |
| JP | 10-126068 | 5/1998 | | KR | 20-0279427 | 6/2002 |
| JP | 10-214034 | 8/1998 | | KR | 10-353035 | 9/2002 |
| JP | 10-228333 | 8/1998 | | KR | 20-253576 | 10/2002 |
| JP | 11-006520 | 1/1999 | | KR | 20-295990 | 11/2002 |
| JP | 11-095866 | 4/1999 | | KR | 20-304340 | 2/2003 |
| JP | 11-95866 | 4/1999 | | KR | 2003-0058204 | 7/2003 |
| JP | 11-154460 | 6/1999 | | KR | 20030058204 | 7/2003 |
| JP | 11-214859 | 8/1999 | | KR | 2001-35722 | 5/2007 |

| | | | |
|---|---|---|---|
| WO | 00/73027 | A2 | 12/2000 |

OTHER PUBLICATIONS

U.S. Appl. No. 10/314,350, filed Dec. 2002, Sang-keong Ha et al.
U.S. Appl. No. 10/314,350, filed Dec. 9, 2002, Sang-kyeong Ha et al.
U.S. Appl. No. 11/889,998, filed Aug. 17, 2007, Ju-hwan Kim et al.
U.S. Patent Publication No. 2006/0219849 published Oct. 5, 2006 to Chiu.
Korean Patent Office Action, mailed Oct. 19, 2007 and issued in corresponding Korean Patent Application No. 10-2002-0069680.
European Search Report dated Apr. 25, 2008, issued in European Patent Application No. 07103148.8-1252.
Japanese Decision to Grant mailed Jul. 18, 2008 in JP 2005-360915.
European Search Report mailed Jun. 30, 2008 in European Application No. 07103148.8-1252/1790901.
"Vesa Mounting Interface Standard," http://www.ergotron.com/2_Products/Product_pages/FP_ARMS/VESA/fp_vesa.asp.
U.S. Appl. No. 10/295,831, filed Nov. 18, 2002, Hyun-jun Jung et al., Samsung Electronics Co, LTD.
U.S. Appl. No. 10/314,350, filed Dec. 1, 2002, Sang-kyeong Ha et al., Samsung Electronics Co. LTD.
U.S. Appl. No. 10/646,864, filed Apr. 1, 2003, You-Sik Hong et al., Samsung Electronics Co. LTD.
U.S. Appl. No. 10/671,863, filed Sep. 1, 2003, Ju-hwan Kim et al., Samsung Electroncis Co. LTD.
U.S. Appl. No. 10/694,029, filed Oct. 1, 2003, Nam-il Cho et al., Samsung Electronics Co. LTD.
U.S. Appl. No. 10/694,041, filed Oct. 1, 2003, You-Sub Lee et al., Samsung Electronics Co. LTD.
U.S. Appl. No. 10/0705,770, filed Nov. 1, 2003, Ju-hwan Kim et al., Samsung Electronics Co. LTD.
U.S. Appl. No. 10/792,745, filed Mar. 1, 2004, Sang-kyeong Ha et al., Samsung Electronics Co. LTD.
U.S. Appl. No. 10/916,436, filed Aug. 12, 2004, Hyun-jun Jung et al., Samsung Electroncis Co, LTD.
U.S. Appl. No. 10/916,447, Aug. 12, 2004, Hyun-jun Jung et al., Samsung Electronics Co, LTD.
U.S. Appl. No. 10/406,269, Apr. 4, 2003, You-sik Hong, et al., Samsung Electronics Co, LTD.
Vesa Mounting Interface Standard, Mar. 19, 2003, 2 pages, www.ergotron.com/2_Product_pages/FP_ARMS/VESA/fp_vesa.asp.
Third Party Submission document filed Aug. 27, 2004 in Korean Industrial Property Office, issued Sep. 22, 2004.
Chinese Office Action of Application No. 03110326.X issued Sep. 24, 2004.
Chinese Office Action of Application No. 03154931.4 issued Sep. 9, 2005.
Singapore Office Action issued on May 13, 2005.
Korean Office Action issued on Jul. 26, 2004.
Japanese Office Action mailed Sep. 21, 2004 in JP 2002-333914.
Japanese Office Action mailed Jun. 14, 2005 in JP 2002-333914.
Korean Office Action issued on Mar. 16, 2005.
Korean Office Action issued on Aug. 20, 2004.
SIPO Office Action issued on Sep. 9, 2005.
Vesa Mounting Interface Standard, Mar. 19, 2003, 2 pages, www.ergotron.com/2_Product_pages/FP_ARMS/VESA/fp_vesa.asp.
U.S. Appl. No. 10/295,831, filed Nov. 18, 2002, Hyun-jun Jung et al., Samsung Electronics Co., LTD.
U.S. Appl. No. 10/916,436, filed Aug. 12, 2004, Hyun-jun Jung et al., Samsung Electronics Co., LTD.
U.S. Appl. No. 10/916,447, filed Aug. 12, 2004, Hyun-jun Jung et al., Samsung Electronics Co., LTD.
Japanese Office Action mailed Sep. 21, 2004 in JP 2002-333914.
Japanese Office Action mailed Jun. 14, 2005 in JP 2002-333914.

* cited by examiner

MONITOR

CROSS-REFERENCE TO RELATED APPLICATIONS

This application claims the benefit of Korean Patent Application No. 2002-59208, filed Sep. 28, 2002, in the Korean Intellectual Property Office, the disclosure of which is incorporated herein by reference.

BACKGROUND OF THE INVENTION

1. Field of the Invention

The present invention relates to a monitor, and more particularly, to a monitor having a monitor main body and a base member supporting the monitor main body.

2. Description of the Related Art

Generally, a monitor includes a monitor main body displaying a picture thereon, a base member supporting the monitor main body, and a link member allowing the monitor main body to be forward and backward tilted and adjusting a height of the monitor main body with respect to the base member.

On the other hand, according to a wide and rapid spread of computer systems, demands on monitors are also rapidly increasing. In relation to the increased demands on the monitors, there has been provided an arm stand to support a monitor, which is manufactured separately from the monitor and combined to the monitor, to thereby meet various users preferences. Further, a combining structure of the monitor and the arm stand has been regulated by VESA (video electronic standard association).

As shown in FIG. 1, a conventional monitor includes a base member 201 laid on a horizontal plane, a monitor main body 202 displaying a picture thereon, and a link member 210 linking the base member 201 with the monitor main body 202.

A lower part of the link member 210 is forward and backward tiltably combined to the base member 201 using a pair of fixing brackets 204 and 206, and an upper part of the link member 210 is fixed to the monitor main body 202.

Thus, along a direction of an arrow "A" in FIG. 1, the link member 210 can be forward and backward tilted relative to the base member 201, but the monitor main body 202 cannot be tilted relative to the link member 210. Therefore, in the conventional monitor, it is possible to adjust a height of the monitor main body 202, but it is inconvenient to adjust an angle of the monitor main body 202 with respect to the base member 201.

Contrary to the monitor shown in FIG. 1, it is possible that the upper part of the link member 210 is rotatably combined to the monitor main body 202, and the lower part of the link member is fixed to the base member 201. In this structure, it is possible to adjust the angle of the monitor main body 202, but it is inconvenient to adjust the height of the monitor main body 202.

However, in the conventional monitor, because the height of the monitor main body 202 is adjusted by rotating the link member 210 relative to the base member 201 and a size of the link member 210 should depend on a size of the base member 201, an allowable height adjustment of the monitor main body 202 is relatively small.

Further, in the conventional monitor, because the monitor main body 202 is not folded to the base member 201, a packing volume of the monitor cannot be decreased, thereby increasing costs for keeping and carrying the monitor.

Further, in the conventional monitor, because the base member 201 must be laid on only the horizontal plane, it is impossible to install the monitor onto an inclined plane, such as a wall, the arm stand for the monitor, etc.

SUMMARY OF THE INVENTION

Accordingly, it is an aspect of the present invention to provide a monitor in which an allowable height adjustment of a monitor main body is relatively large, and costs for keeping and carrying the monitor can be decreased by decreasing a packing volume of the monitor.

It is another aspect of the present invention to provide a monitor, in which a height of a monitor main body can be adjusted without changing a tilting angle of the monitor main body, and a tilting angle of the monitor main body with respective to a base member can be properly adjusted.

It is still another aspect of the present invention to provide a monitor, in which a base member is detachably combined with a base bracket and can be installed onto an inclined plane, such as a wall, an arm stand, etc., and particularly, easily installed onto various arm stands according to a VESA (video electronic standard association) regulation.

Additional aspects and advantages of the invention will be set forth in part in the description which follows and, in part, will be obvious form the description, or may be learned by practice of the invention.

To achieve the foregoing and/or other aspects of the present invention, a monitor includes a monitor main body displaying a picture thereon, and a base member supporting the monitor main body, a lower link member rotatably combined to a base hinge provided in the base member, an upper link member rotatably combined to a monitor hinge provided in the monitor main body, a link hinge provided between the upper link member and the lower link member and allowing the upper link member to rotate relative to the lower link member, and a first auxiliary link member disposed parallel to the lower link member at a position deviated from axes of the link hinge and the base hinge to connect the lower link member with the upper link member and transmit a rotary motion from the lower link member relative to the base member to the upper link member.

According to another aspect of the invention, the monitor transmits the rotary motion from the upper and lower link members relative to the base member to the monitor main body and includes a second auxiliary link member disposed parallel to the lower link member at another position deviated from the axes of the link hinge and the base hinge to connect the link hinge with the base member, and a third auxiliary link member disposed parallel to the upper link member at another position deviated from axes of the monitor hinge and the link hinge to connect the monitor hinge with the link hinge.

According to another aspect of the invention, the monitor further includes a base bracket combined to the base member to install the base member onto an inclined plane, wherein the base bracket includes at least one hook to be latched when the at least one hook is inserted into at least one hook hole formed on the base member to detachably combine the base bracket to the base member.

According to another aspect of the invention, the base bracket includes at least one first combining hole so as to be installed on the inclined plane.

According to another aspect of the invention, the base bracket includes at least one second combining hole through which the base bracket is combined with the base member, and the base member includes a third combining hole corresponding to the second combining hole.

According to another aspect of the invention, the second combining hole of the base bracket and the third combining hole of the base member are formed according to a VESA regulation.

According to another aspect of the invention, the monitor further includes first and second base brackets spaced-apart from each other and combined with the base member, and the base hinge includes first and second base hinge parts rotatably connecting first lower opposite parts of the lower link member to the first and second base brackets, respectively.

According to another aspect of the invention, the first base hinge part includes a first hinge pin formed with a first end having a circular cross section and a second end having a noncircular cross section, a first pin accommodating part formed on one of the first lower opposite parts of the lower link member to accommodate the first end of the first hinge pin to be rotatable therein, and a first pin holding part formed on one side of the first base bracket and fitting the second end of the first hinge pin therein.

According to an aspect of the invention, between the first pin accommodating part and the first end of the first hinge pin is interposed a first friction spring resisting a rotation of the first hinge pin.

According to another aspect of the invention, the first base bracket is formed with a spring supporting part protruding from one side thereof, and a torsion spring is disposed on the spring supporting part and elastically biased in an opposite direction to a downward rotation of the lower link member relative to the base member.

According to another aspect of the invention, the second base hinge part includes a second hinge pin formed with a first end having the circular cross section and a second end having the noncircular cross section, a second pin accommodating part formed on the other one of the first lower opposite parts of the lower link member and accommodating the first end of the second hinge pin rotatable therein, and a second pin holding part formed on one side of the second base bracket and fitting the second end of the second hinge pin therein.

According to an aspect of the invention, at least one of the first and second base hinge parts is provided with a rotation restricting part restricting a rotation of the lower link member relative to the base member within a first predetermined angle range.

According to another aspect of the invention, the rotation restricting part includes a pair of first stoppers formed by cutting a fan shaped groove from the other first lower opposite part of the lower link member and disposed around the second pin accommodating part to face the second pin holding part, and a pair of first projections provided around the second pin holding part formed on one side of the second base bracket and selectively stopped by one of the first stoppers according to a rotating direction of the lower link member.

According to another aspect of the invention, the link hinge includes first and second link hinge parts to rotatably connect first upper opposite parts of the lower link member with second lower opposite parts of the upper link member, respectively.

According to another aspect of the invention, the first link hinge part includes a first hinge axle combined to one of the second lower opposite parts of the upper link member and one of the second upper opposite parts of the lower link member to rotatably connect the one second lower opposite part of the upper link member with one of the first upper opposite parts of the lower link member, a first axle accommodating part formed in the one first upper opposite part of the lower link member and receiving the first hinge axle rotatable therethrough, and a first axle holding part formed on the one first lower opposite part of the upper link member and combined with a first end of the first hinge axle to rotate coincidentally with the upper link member.

According to another aspect of the invention, the second link hinge part includes a second hinge axle combined with the other one of the second lower opposite parts of the upper link member and the other first upper opposite part of the lower link member to rotatably connect the other second lower opposite part of the upper link member with the other first upper opposite part of the lower link member, a second axle accommodating part formed in the other first upper opposite part of the lower link member to receive the second hinge axle to be rotatable therethrough, and a second axle combining part formed on the other second lower opposite part of the upper link member and passing the second hinge axle rotatable therethrough.

According to another aspect of the invention, the monitor further includes first and second monitor brackets spaced-apart from each other and combined with the monitor main body, and the monitor hinge includes first and second monitor hinge parts rotatably connecting second upper opposite parts of the upper link member to the first and second monitor brackets, respectively.

According to another aspect of the invention, the first monitor hinge part includes a third hinge pin formed with a first end having a circular cross section and a second end having a noncircular cross section, a third pin accommodating part formed on one side of the first monitor bracket to receive the first end of the third hinge pin rotatable therein, and a third pin holding part formed in one of the second upper opposite part of the upper link member and fitting the second end of the third hinge pin therein.

According to another aspect of the invention, the second monitor hinge part includes a fourth hinge pin formed with a first end having a circular cross section and a second end having a noncircular cross section, a fourth pin accommodating part formed on one side of the second monitor bracket to receiving the first end of the fourth hinge pin rotatable therein, a third hinge axle fitting the second end of the fourth hinge pin therein and rotating coincidentally with the fourth hinge pin, and a third hinge axle accommodating part formed in the other second upper opposite part of the upper link member to receive the third hinge axle to be rotatable therethrough.

According to another aspect of the invention, between the fourth pin accommodating part and the first end of the fourth hinge pin is interposed a second friction spring resisting a rotation of the fourth hinge pin.

According to another aspect of the invention, at least one of the first and second monitor hinge parts is provided with a tilt restricting part restricting a tilt of the monitor main body with respect to the upper link member within a second predetermined angle range.

According to another aspect of the invention, the tilt restricting part includes a tilt restricting washer formed with a matching hole matching with the second end of the fourth hinge pin, and a pair of second stoppers protruding from a circumference thereof at a predetermined distance therebetween, and a flat spring combined to one side of the second monitor bracket to be rotatable between the second stoppers of the tilt restricting washer coincidentally with the monitor main body, and restricting the tilt of the monitor main body relative to the upper link member within the second predetermined angle range.

According to another aspect of the invention, the flat spring is formed with an elastic projection part to be disposed between the second stoppers of the tilt restricting washer.

According to another aspect of the invention, the elastic projection part of the flat spring is deformed enough to pass at least one of the second stoppers of the tilt restricting washer.

According to another aspect of the invention, the first auxiliary link member is formed with a pair of linking members, the first base bracket is formed with a first auxiliary link supporting part coupled with a lower part of the first auxiliary link member, and the second end of the first hinge axle of the first link hinge part is formed with the first auxiliary link combination part coupled with an upper part of the first auxiliary link member.

According to another aspect of the invention, the first auxiliary link supporting part and the first auxiliary link combination part are respectively formed with a pair of first pin holes spaced-apart from each other at a predetermined distance, first opposite end parts of the first auxiliary link member are formed with a first pin through hole to be aligned with the first pin holes, and first link pins are inserted in the first pin holes through the first pin through hole.

According to another aspect of the invention, the second auxiliary link member is formed with a pair of linking members the second base bracket is formed with a second auxiliary link supporting part coupled with a lower part of the second auxiliary link member, and the first end of the second hinge axle is formed with the second auxiliary link combination part coupled with an upper part of the second auxiliary link member.

According to another aspect of the invention, the second auxiliary link supporting part and the second auxiliary link combination part are respectively formed with a pair of second pin holes spaced-apart from each other at another predetermined distance, second opposite end parts of the second auxiliary link member are formed with a second pin through hole to be aligned with the second pin holes, and second link pins are inserted in the second pin holes through the second pin through hole.

According to another aspect of the invention, the third auxiliary link member is formed a pair of linking members, and the second end of the second hinge axle is formed with a third auxiliary link supporting part coupled with a lower part of the third auxiliary link member, and the second end of the third hinge axle is formed with the third auxiliary link combination part coupled with an upper part of the third auxiliary link member.

According to another aspect of the invention, the third auxiliary link supporting part and the third auxiliary link combination part are respectively formed with a pair of third pin holes spaced from each other at another predetermined distance, third opposite end parts of the third auxiliary link member are formed with a third pin through hole to be aligned with the third pin holes, and third link pins are inserted in the third pin holes through the third pin through hole.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
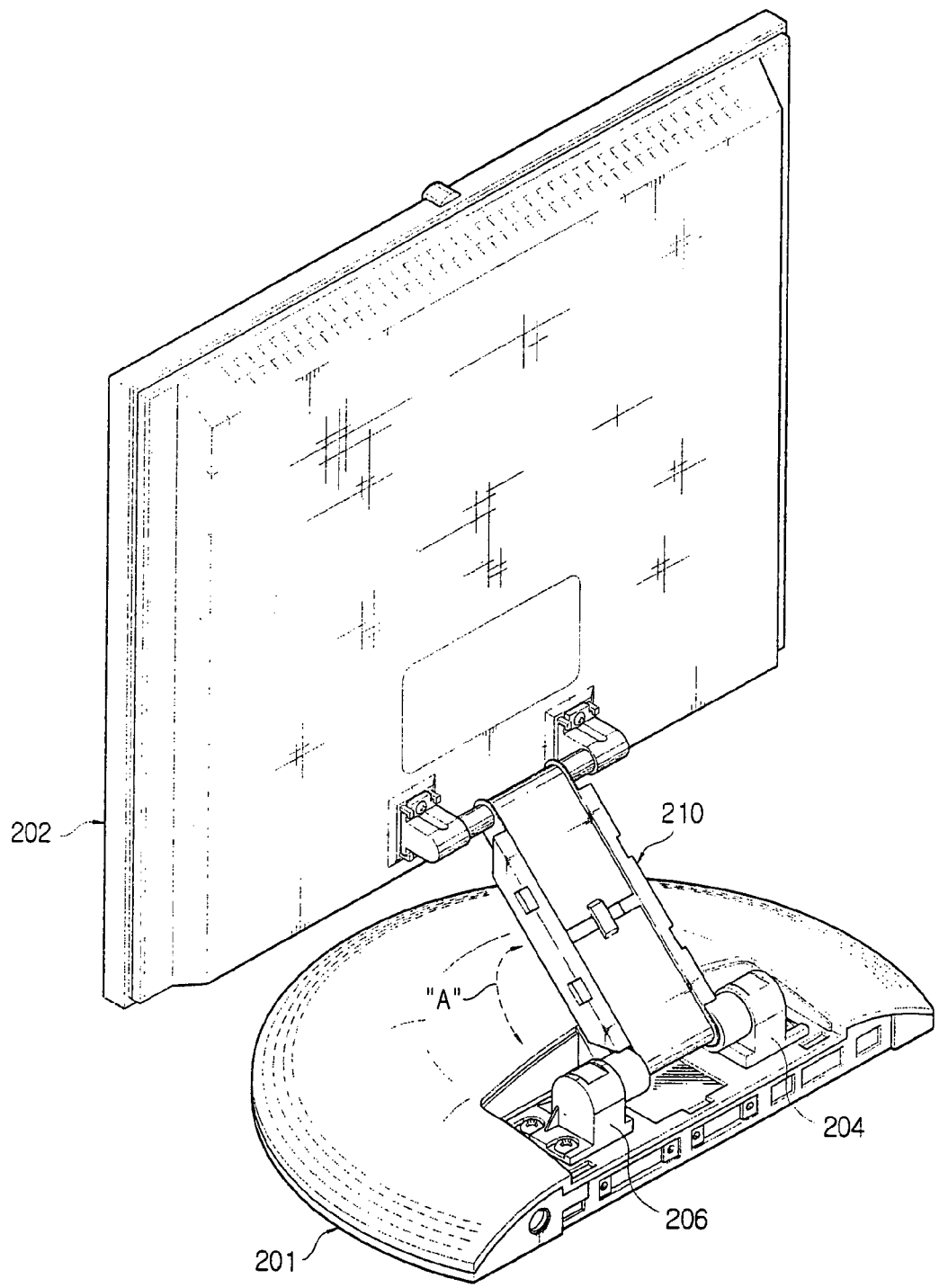
FIG. 1 is a perspective view illustrating a rear of a conventional monitor.

Reference will now be made in detail to the embodiment of the present invention, examples of which are illustrated in the accompanying drawings, wherein like reference numerals refer to like elements throughout. The embodiment is described below in order to explain the present invention by referring to the figures.

Generally, a monitor includes a monitor main body displaying a picture thereon, and a base member supporting the monitor main body and laid on a predetermined inclined plane, such as a wall, a table, etc.

Recently, the monitor is being made of an LCD (liquid crystal display), so that the monitor can have a relatively thin monitor main body even if a displaying area thereof is enlarged. Hereinbelow, the monitor made of an LCD panel will be exemplarily described.

Figure 2:
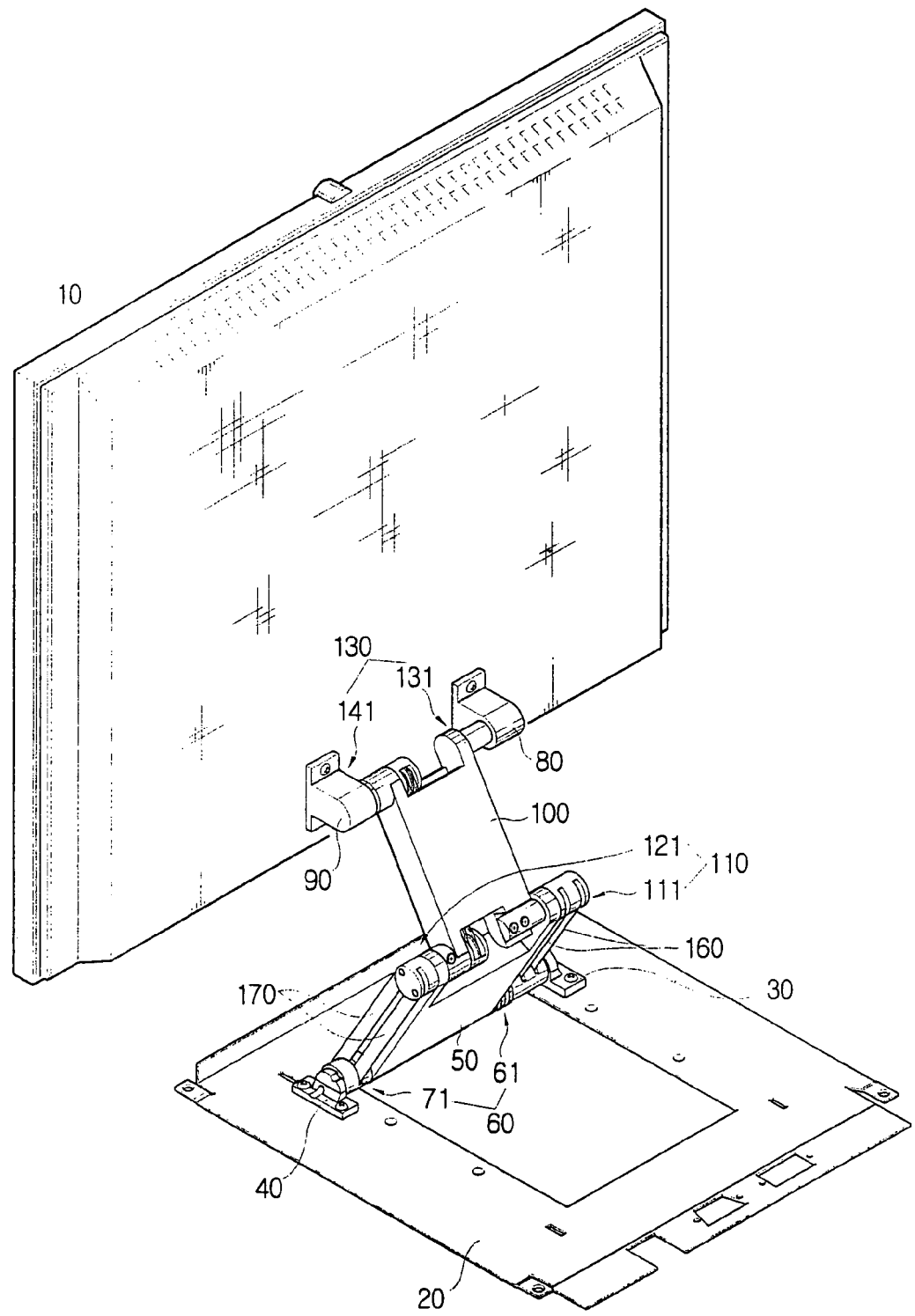
FIG. 2 is a perspective view illustrating a rear of a monitor according to an embodiment of the present invention.
Figure 3:
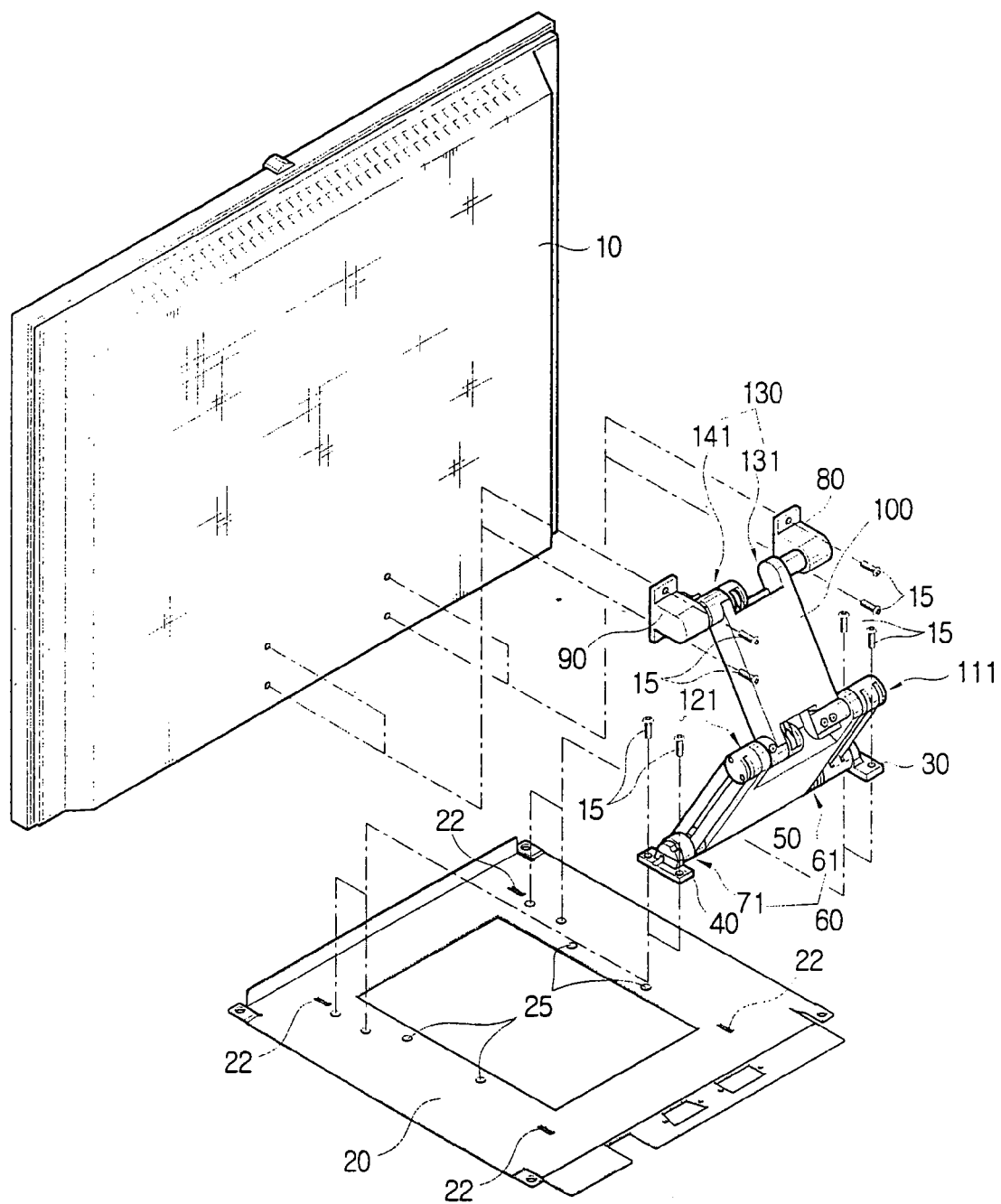
FIGS. 3 and 4 are exploded perspective views of the monitor of FIG. 2.
Figure 4:
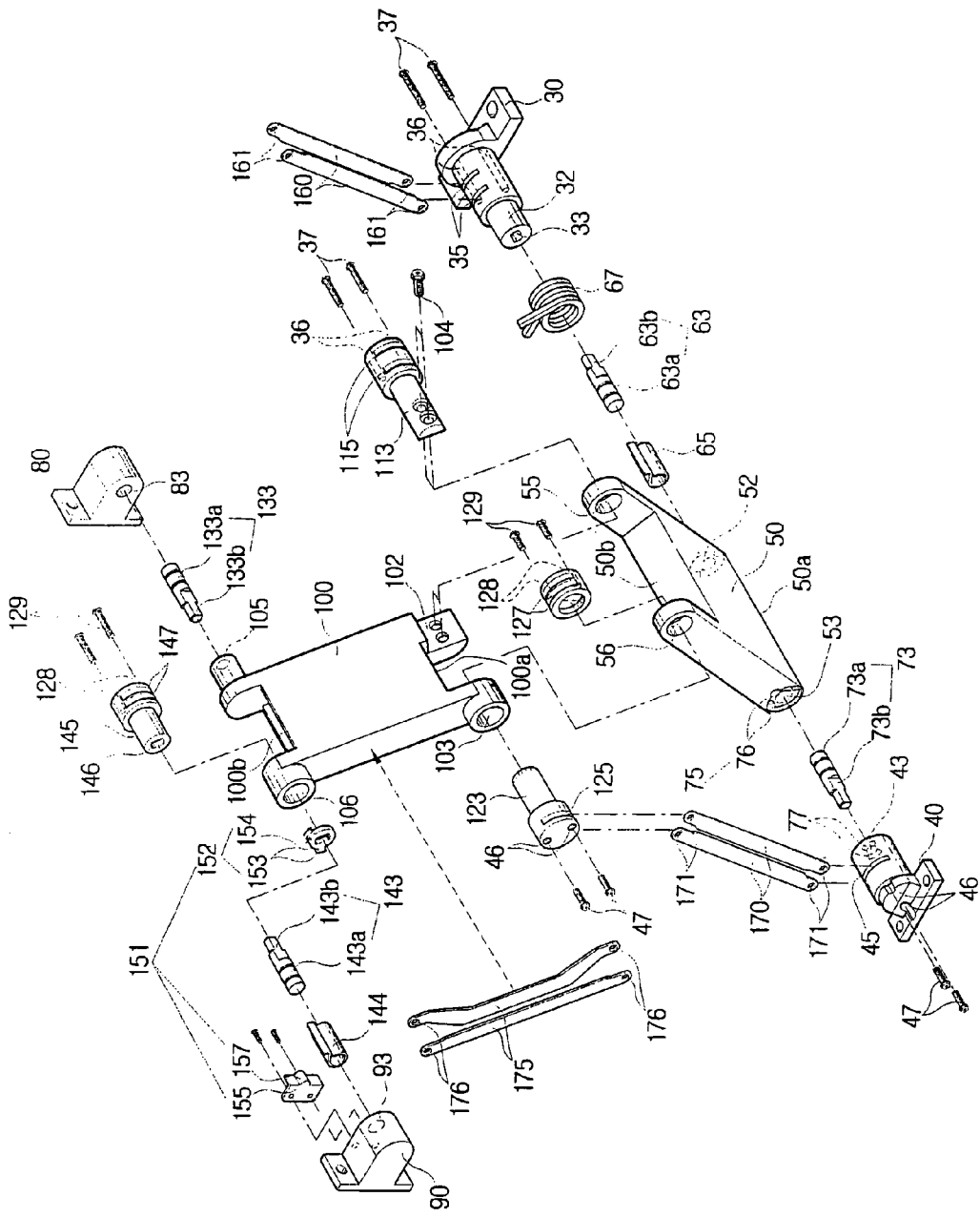

As shown in FIGS. 2 through 4, the monitor according to an embodiment of the present invention includes a monitor main body 10, a base member 20 supporting the monitor main body 10, a lower link member 50 rotating relative to the base member 20, a base hinge 60 provided between the base member 20 and the lower link member 50 and allowing the lower link member 50 to rotate relative to the base member 20, an upper link member 100 rotating relative to the monitor main body 10, a monitor hinge 130 provided between the monitor main body 10 and the upper link member 100 and allowing the upper link member 100 to rotate relative to the monitor main body 10, a link hinge 110 provided between the upper link member 100 and the lower link member 50 and allowing the upper link member 100 to rotate relative to the lower link member 50, a first auxiliary link member 160 transmitting a rotary motion from the lower link member 50 relative to the base member 20 to the upper link member 100, second and third auxiliary link members 170 and 175 transmitting the rotary motion from the lower and upper link members 50 and 100 relative to the base member 20 to the monitor main body 10, first and second base brackets 30 and 40 spaced-apart from each other and combined to the base member 20, and first and second monitor brackets 80 and 90 spaced-apart from each other and combined to the monitor main body 10.

On a front of the monitor main body 10 is provided a screen (not shown), and on a rear thereof are fastened the first and second monitor brackets 80 and 90 with screws 15, wherein the first and second monitor brackets 80 and 90 are spaced-apart from each other and rotatably combined to the upper link member 100.

The base member 20 is laid on a horizontal plane, such as a table, and supports the monitor main body 10. On the base member 20 are fastened the first and second base brackets 30 and 40 with the screws 15.

The base hinge 60 includes first and second base hinge parts 61 and 71 rotatably connecting first lower opposite parts 50a of the lower link member 50 to the first and second base brackets 30 and 40, respectively.

The lower link member 50 is rectangular and includes the first lower opposite parts 50a rotatably connected by the first and second base hinge parts 61 and 71 to the first and second base brackets 30 and 40 fastened to the base member 20, and first upper opposite parts 50b rotatably connected by first and second link hinge parts 111 and 121 (to be described later) to second lower opposite parts 100a of the upper link member 100.

The first base hinge part 61 includes a first hinge pin 63 formed with a first end 63a having a circular cross section and a second end 63b having a noncircular cross section, a first pin accommodating part 52 formed on one of the first lower opposite parts 50a of the lower link member 50 to accommodate the first end 63a of the first hinge pin 63 therein to be rotatably combined with the first hinge pin 63, a first pin holding part 33 formed on one side of the first base bracket 30 and fitting the second end 63b of the first hinge pin 63 therein, and a first friction spring 65 interposed between the first pin accommodating part 52 and the first end 63a of the first hinge pin 63 to resist (restrict) a rotation of the first hinge pin 63. Further, in the one side of the first base bracket 30 is formed a spring supporting part 32, and a torsion spring 67 is inserted around the spring supporting part 32 to be elastically biased in an opposite direction to a downward rotation of the lower link member 50 relative to the base member 20.

The first end 63a of the first hinge pin 63 is inserted in the first friction spring 65, so that friction is produced when the first hinge pin 63 is rotated, and it is possible that the friction is stronger than a torque due to a weight of the monitor main body 10 rotating about an axis of the first hinge pin 63. Further, the first friction spring 65 is matched with (fixedly inserted into) the first pin accommodating part 52 not to rotate coincidentally with the first hinge pin 63.

The second end 63b of the first hinge pin 63 is fitted in the first pin holding part 33 formed on an end of the spring supporting part 32 of the first base bracket 30, so that the first hinge pin 63 does not rotate relative to the first base bracket 30.

The torsion spring 67 is inserted around the spring supporting part 32 of the first base bracket 30 and has one end coupled to the one first lower opposite part 50a of the lower link member 50 and the other end coupled to the first base bracket 30. Here, the torsion spring 67 provides elasticity to the lower link member 50 to be biased in an opposite direction to a downward rotation of the lower link member 50 relative to the base member 20. Further, the elasticity of the torsion spring 67 is approximately equal to the torque due to the weight of the monitor main body 10 rotating about the axis of the first hinge pin 63. Here, the weight of the monitor main body 10 is offset against the elasticity of the torsion spring 67, so that a user can easily rotate the lower link member 50 relative to the base member 20. Further, a user can easily rotate the lower link member 50 relative to the base member 20 with a force large enough to overcome the friction between the first friction spring 65 and the first hinge pin 63.

The second base hinge part 71 includes a second hinge pin 73 formed with a first end 73a having a circular cross section and a second end 73b having a noncircular cross section, a second pin accommodating part 53 formed on the other one of the first lower opposite parts 50a of the lower link member 50 to accommodate the first end 73a of the second hinge pin 73 therein so as to be rotatably combined with the second hinge pin 73, a second pin holding part 43 formed on one side of the second base bracket 40 and fitting the second end 73b of the second hinge pin 73 therein, and a rotation restricting part 75 restricting a rotation of the lower link member 50 relative to the base member 20 within a first predetermined angle range.

The second hinge pin 73 has the same shape as the first hinge pin 63, and the first end 73a of the second hinge pin 73 is rotatably inserted in the second pin accommodating part 53 formed on the other first lower opposite part 50a of the lower link member 50. Further, the second end 73b of the second hinge pin 73 is fitted in the second pin holding part 43 formed on the second base bracket 40, so that the second hinge pin 73 does not rotate relative to the second base bracket 40.

The rotation restricting part 75 includes a pair of first stoppers 76 and a pair of first projections 77. Here, the first stoppers 76 are formed by cutting a fan shaped groove from the other first lower opposite part 50a of the lower link member 50 and disposed around the second pin accommodating part 53 to face the second base bracket 40. The first projections 77 are provided around the second pin holding part 43 formed on the one side of the second base bracket 40 and are selectively stopped by one of the first stoppers 76 according to a rotating direction of the lower link member 50.

Here, the lower link member 50 is rotatably combined to the second base bracket 40, which is fastened onto the base member 20, at its rotatable angle relative to the base member 20 to be restricted within a predetermined range. For instance, the rotatable angle of the lower link member 50 ranges from 0° to 90°. Here, the rotatable angle is determined according to a design of the first stoppers 76 and the first projections 77, so that the rotatable angle can be changed by modifying the first stoppers 76 and the first projections 77, e.g., adjusting a relative position between the first stoppers 76 and the first projections 77 (refer to FIGS. 10 and 11).

Figure 10:
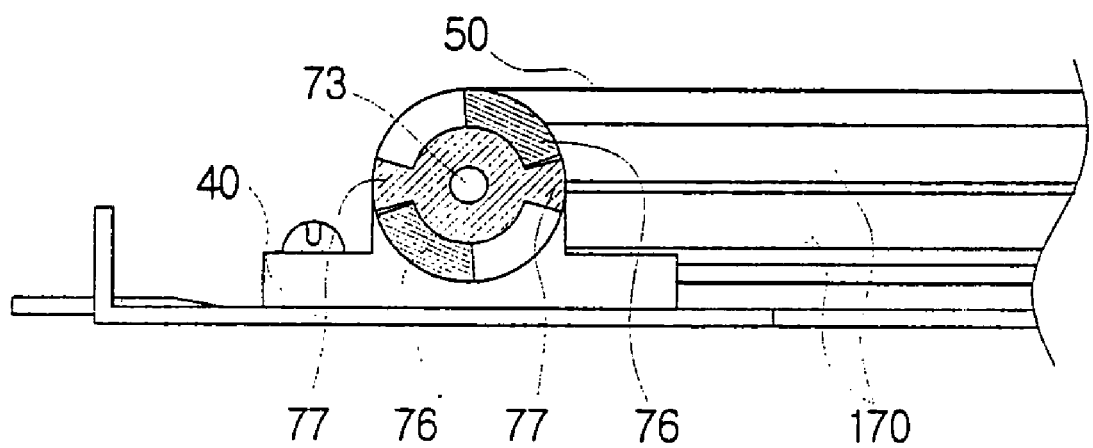
FIGS. 10 and 11 are partially enlarged sectional views illustrating operations of a lower link member relative to the base member in the monitor of FIG. 2.
Figure 11:
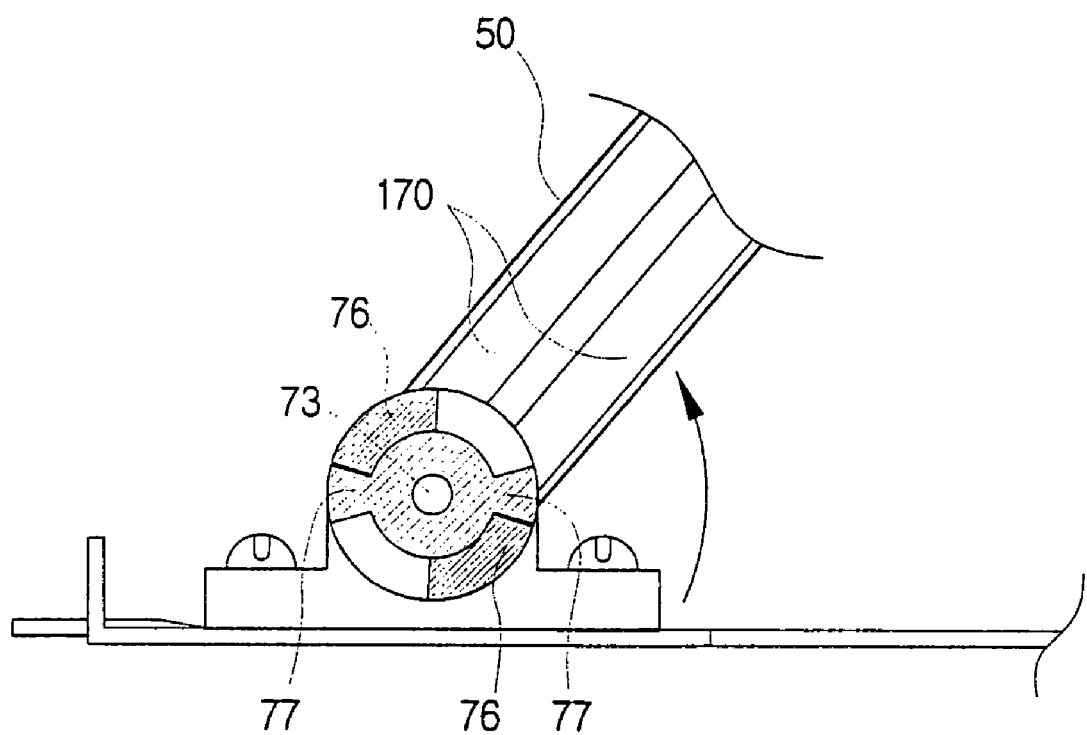

With this configuration, an operation of the lower link member 50 hinging on the base hinge 60 is as follows. First, when the lower link member 50 in a state shown in FIG. 2 is pulled down toward the base member 20 with a predetermined force, the lower link member 50 is downwardly rotated about the axes of the first and second hinge pins 63 and 73 until the first stopper 76 incorporated with the lower link member 50 is stopped by one side of the first projection 77 formed on the second base bracket 40 (refer to FIG. 10). At this time, the lower link member 50 is generally designed to be folded onto the base member 20. To the contrary, when the lower link member 50 in another state shown in FIG. 10 is pulled upward from the base member 20 with the predetermined force, the lower link member 50 is upwardly rotated about the axes of the first and second hinge pins 63 and 73 until the first stopper 76 incorporated with the lower link member 50 is stopped by the other side of the first projection 77 formed on the second base bracket 40 (refer to FIG. 11). At this time, the user can easily rotate the lower link member 50 relative to the base member 20 with the force great enough to overcome the friction between the first friction spring 65 and the first hinge pin 63 because the weight of the monitor main body 10 is offset against the elasticity of the torsion spring 67.

Thus, the user can easily rotate the lower link member 50 relative to the base member 20 with the same force regardless of the upward or downward rotating direction.

The link hinge 110 includes the first and second link hinge parts 111 and 121 to rotatably connect the first upper opposite parts 50b of the lower link member 50 with second lower opposite parts 100a of the upper link member 100.

The upper link member 100 is rectangular and includes the second lower opposite parts 100a to be rotatably connected by the first and second link hinge parts 111 and 121 to the first upper opposite sides 50b of the lower link member 50, and second upper opposite parts 100b rotatably connected by first and second monitor hinge parts 131 and 141 (to be described later) of the monitor hinge 130 to the first and second monitor brackets 80 and 90 fastened to the monitor main body 10.

The first link hinge part 111 includes a first hinge axle 113 combined to one of the second lower opposite parts 100a of the upper link member 100 and one of the first upper opposite parts 50b of the lower link member 50 so as to rotatably connect the one second lower opposite part 100a of the upper link member 100 with the one first upper opposite part 50b of the lower link member 50, a first axle accommodating part 55 protruding from the one first upper opposite part 50b of the lower link member 50 to receive the first hinge axle 113 rotatable therethrough, and a first axle holding part 102 formed on the one second lower opposite part 100a of the upper link member 100 and combined with a first end of the first hinge axle 113 by first screws 104 so as to rotate coincidentally with the upper link member 100.

The first hinge axle 113 includes the first end combined to the first axle holding part 102 formed on the one second lower opposite part 100a of the upper link member 100 by the first screws 104 and rotating coincidentally with the upper link member 100, and a second end formed with an first auxiliary link combination part 115 accommodating a pair of first auxiliary link members 160. The first hinge axle 113 is rotatably inserted in the first axle accommodating part 55 formed on the one first upper opposite part 50b of the lower link member 50. Hence, the one second lower opposite part 100a of the upper link member 100 is rotated relative to the lower link member 50 about an axis of the first hinge axle 113.

The second link hinge part 121 includes a second hinge axle 123 combined to the other one of the second lower opposite parts 100a of the upper link member 100 and the other first upper opposite part 50b of the lower link member 50 so as to rotatably connect the other second lower opposite part 100a of the upper link member 100 with the other first upper opposite part 50b of the lower link member 50, a second axle accommodating part 56 protruding from the other first upper opposite part 50b of the lower link member 50 to receive the second hinge axle 123 rotatable therethrough, and a second axle combining part 103 formed on the other second lower opposite part 100a of the upper link member 100 to accommodate the second hinge axle 123 rotatable therethrough.

The second hinge axle 123 includes a first end formed with a second auxiliary link combination part 125 accommodating a pair of second auxiliary link members 170 (to be described later), and a second end combined with a third auxiliary link combination part 127 accommodating a pair of third auxiliary link members 175 (to be described later). The second hinge axle 123 is rotatably combined to the second hinge axle holding part 103 formed on the other second lower opposite part 100a of the upper link member 100 by passing through a second hinge axle accommodating part 56 formed on the other first upper opposite part 50b of the lower link member 50.

Thus, the upper link member 100 is rotatable relative to the lower link member 50 about the axis of the first and second hinge axles 113 and 123.

The monitor hinge 130 includes the first and second monitor hinge parts 131 and 141 rotatably connecting the second upper opposite parts 100b of the upper link member 100 to the first and second monitor brackets 80 and 90.

The first monitor hinge part 131 includes a third hinge pin 133 formed with a first end 133a having a circular cross section and a second end 133b having a noncircular cross section, a third pin accommodating part 83 formed on one side of the third monitor bracket 80 to receive the first end 133a of the third hinge pin 133 rotatable therein, and a third pin holding part 105 protruding from one of the second upper opposite parts 100b of the upper link member 100 and fitting the second end 133b of the third hinge pin 133 therein.

The third hinge pin 133 has the same shape as the first and second hinge pins 63 and 73, and the first end 133a of the third hinge pin 133 is rotatably inserted in the third pin accommodating part 83 formed on the one side of the first monitor bracket 80. Further, the second end 133b of the third hinge pin 133 is fitted in the third pin holding part 105 formed on the second one upper opposite part 100b of the upper link member 100, so that the second end 133b of the third hinge pin 133 does not rotate relative to the monitor main body 10. Here, the first monitor bracket 80 fastened to the monitor main body 10 is rotated relative to the upper link member 100 about an axis of the third hinge pin 133.

The second monitor hinge part 141 includes a fourth hinge pin 143 formed with a first end 143a having a circular cross section and a second end 143b having a noncircular cross section, a fourth pin accommodating part 93 formed on one side of the second monitor bracket 90 to receive the first end 143a of the fourth hinge pin 143 rotatable therein, a third hinge axle 145 fitting the second end 143b of the fourth hinge pin 143 therein and rotating coincidentally with the fourth hinge pin 143, a third hinge axle accommodating part 106 protruding from the other one of the second upper opposite parts 100b of the upper link member 100 to receive the third hinge axle 145 rotatable therethrough, a second friction spring 144 interposed between the fourth pin accommodating part 93 and the first end 143a of the fourth hinge pin 143 and resisting a rotation of the fourth hinge pin 143, and a tilt restricting part 151 restricting a tilt of the monitor main body 10 relative to the upper link member 100 within a second predetermined angle range.

The first end 143a of the fourth hinge pin 143 is inserted in the second friction spring 144, so that the friction is produced when the fourth hinge pin 143 is rotated relative to the second friction spring 144, and it is possible that the friction is stronger than a torque due to the weight of the monitor main body 10 rotating about an axis of the fourth hinge pin 143. Further, the second friction spring 144 is matched with the fourth pin accommodating part 93 to rotate coincidentally with the fourth pin accommodating part 93 of the second monitor bracket 90.

The second end 143b of the fourth hinge pin 143 is fitted in a fourth pin holding part 146 formed on a first end of the third hinge axle 145, so that the fourth hinge pin 143 rotates coincidentally with the third hinge axle 145.

The first end of the third hinge axle 145 is formed with the fourth pin holding part 146 holding the second end 143b of the fourth hinge pin 143 therein so as to rotate coincidentally with the fourth hinge pin 143, and a second end of the third hinge axle 145 is formed with a fourth auxiliary link combination part 147 accommodating the third auxiliary link members 175. Further, the third hinge axle 145 is rotatably inserted into the third hinge axle accommodating part 106 provided in the other second upper opposite part 100b of the upper link member 100. Here, the second monitor bracket 90 fastened to the monitor main body 10 is rotatable relative to the other second upper opposite part 100b of the upper link member 100 about the axis of the fourth hinge pin 143. Here, the third hinge axle 145 rotating coincidentally with the fourth hinge pin 143 is rotatably inserted into the third hinge axle accommodating part 106 provided in the other second upper opposite part 100b of the upper link member 100, with its rotation being limited because the third hinge axle 145 is interlocked with the third auxiliary link member 175 connected to the third hinge axle 145, and this limited rotation of the third hinge axle 145 will be described later in more detail.

Thus, the monitor main body 10 is rotatable relative to the upper link member 100 about the axes of the third and fourth hinge pins 133 and 143.

The tilt restricting part 151 includes a tilt restricting washer 152 irrotatably or fixedly coupled to the fourth hinge pin 143, and a flat spring 155 combined to the second monitor bracket 90 by screws and rotating coincidentally with the monitor main body 10.

The tilt restricting washer 152 is formed with a matching hole 154 matching the second end 143b of the fourth hinge pin 143, and a pair of second stoppers (backward and forward second stoppers) 153 protruding from a circumference of the tilt restricting washer 152 at a predetermined distance from each other.

Figure 13:
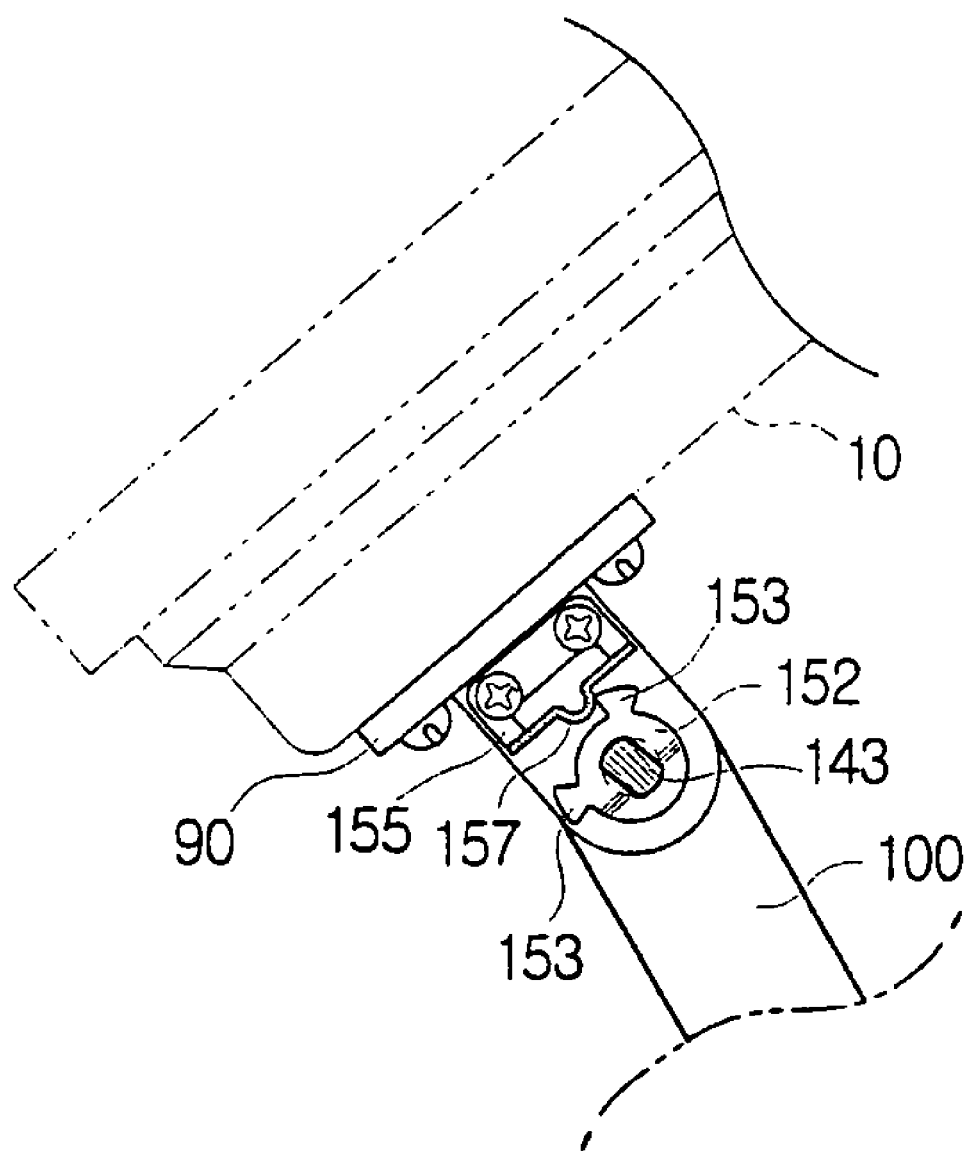
Figure 14:
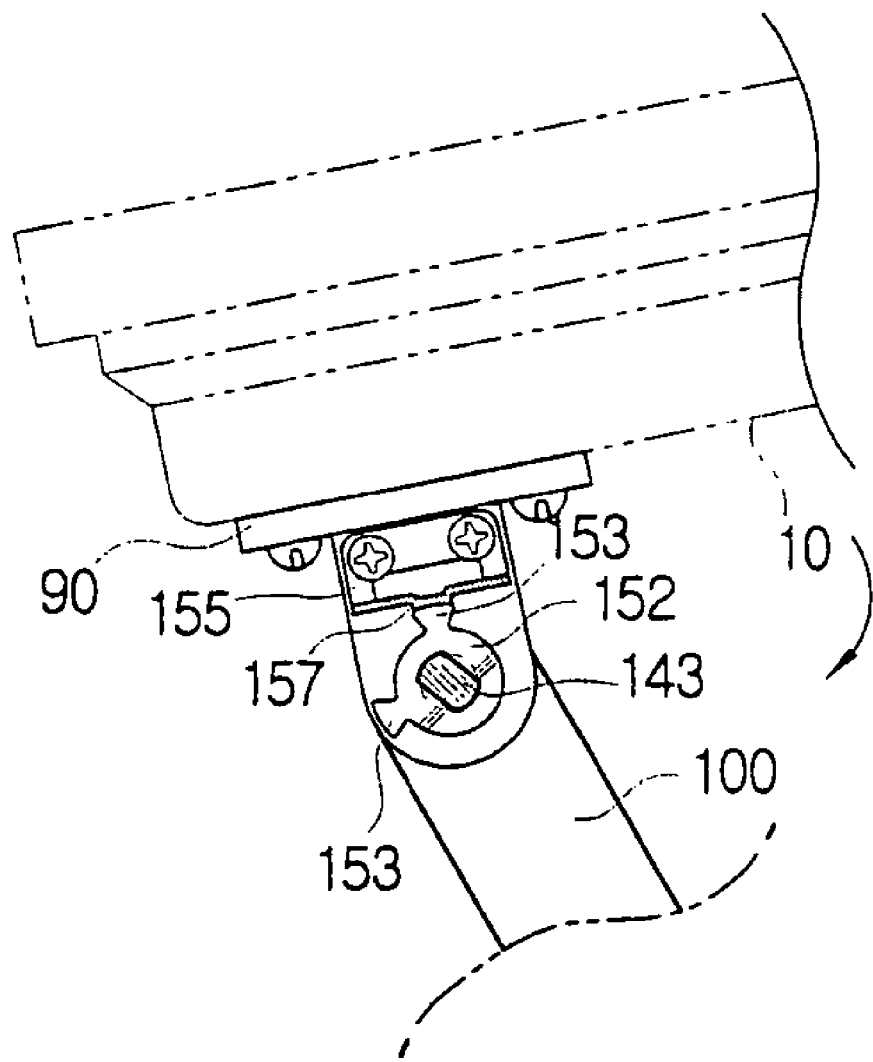

The flat spring 155 is formed with an elastic projection part 157 disposed between the second stoppers 153 of the tilt restricting washer 152 and allows the monitor main body 10 to be tilted relative to the upper link member 100 within the second predetermined angle range. For instance, a tiltable angle of the monitor main body 10 ranges from −5° to 30°. Here, the tiltable angle is determined according to a design of the second stoppers 153, so that the tiltable angle can be changed by modifying the second stoppers 153 (refer to FIGS. 12 and 13). Furthermore, when the monitor main body 10 is tilted backwardly and folded to the upper link member 100, the elastic projection part 157 of the flat spring 155 is deformed enough to pass over the backward second stopper 153 of the tilt restricting washer 152 (refer to FIGS. 9 and 14).

Figure 12:
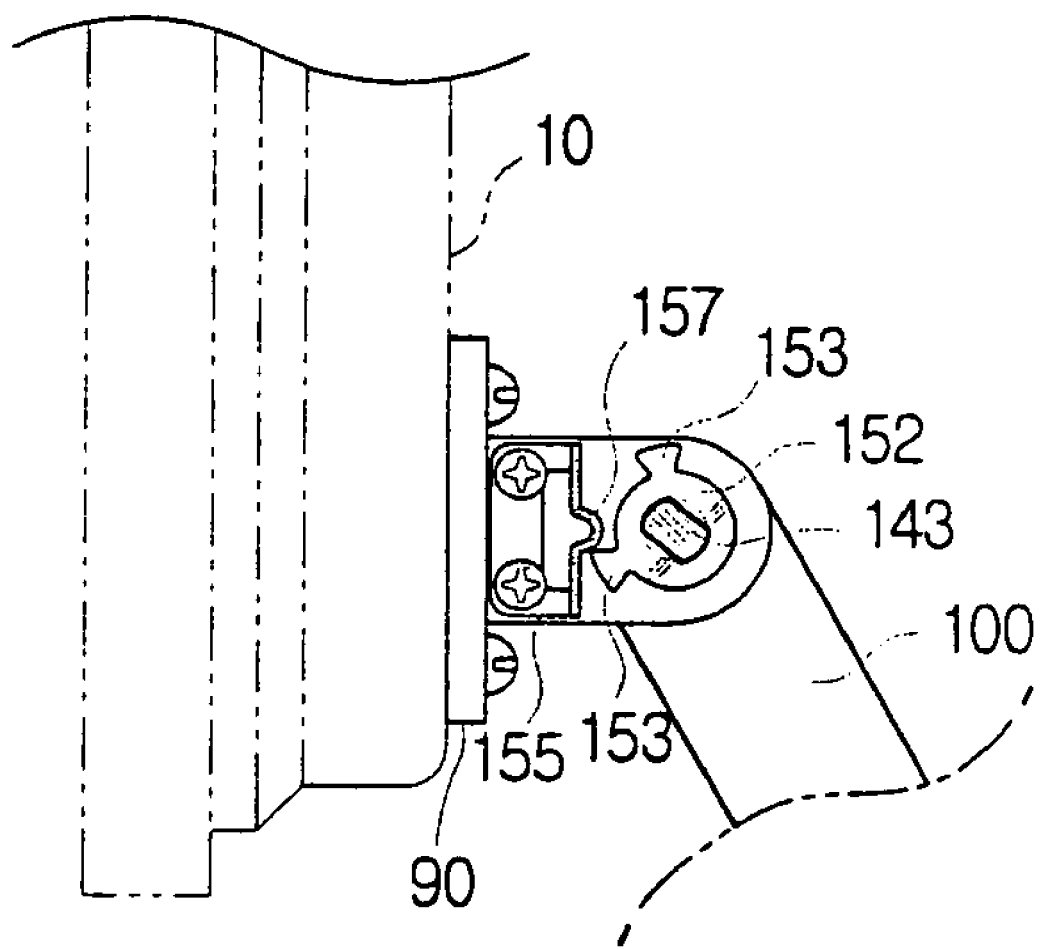
FIGS. 12 to 14 are partially enlarged sectional views illustrating operations of the monitor main body relative to an upper lower link member in the monitor of FIG. 2.

With this configuration, a tilting operation of the monitor main body 10 relative to the upper link member 100 is as follows. First, when the monitor main body 10 in the state of FIG. 2 is forwardly pulled with the predetermined force, the monitor main body 10 is tilted about the axes of the third and fourth hinge pins 133 and 143 until the elastic projection part 157 of the flat spring 155 rotating coincidentally with the monitor main body 10 is stopped by the forward second stopper 153 formed in the tilt restricting washer 152 (refer to FIG. 12). To the contrary, when the monitor main body 10 in a state shown FIG. 12 is backwardly pulled with the predetermined force, the monitor main body 10 is tilted about the axes of the third and fourth hinge pins 133 and 143 until the elastic projection part 157 of the flat spring 155 rotating coincidentally with the monitor main body 10 is stopped by the backward second stopper 153 formed in the tilt restricting washer 152 (refer to FIG. 13). On the other hand, in order to fold the monitor main body 10 to the upper link member 100 completely the monitor main body 10 in another state shown in FIG. 13 should be more backwardly tilted, with the elastic projection part 157 of the flat spring 155 being deformed and passing the backward second stopper 153 of the tilt restricting washer 152 (refer to FIGS. 9 and 14).

Figure 9:
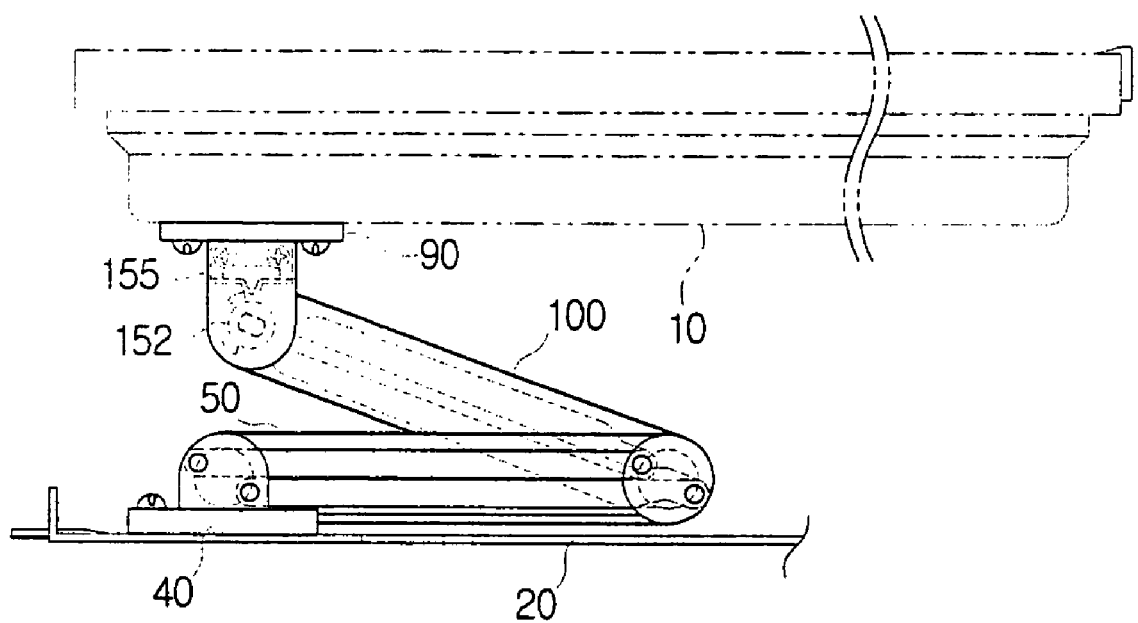
FIG. 9 is a side view illustrating a monitor main body being folded to a base member in the monitor of FIG. 2.

As shown in FIG. 9, according as the monitor main body 10 can be folded to the base member 20, a packing volume of the monitor can be decreased, thereby decreasing costs for keeping and carrying the monitor.

The first auxiliary link member 160 is formed with a pair of linking members which are respectively disposed at a position deviated from rotation axes of the first hinge axle 113 of the first link hinge part 111 and the first hinge pin 63 of the first base hinge part 61 to move parallel to the lower link member 50. Further, the first auxiliary link member 160 connects the upper link member 100 and the base member 20 and transmits a rotary motion from the lower link member 50 relative to the base member 20 to the upper link member 100.

The first auxiliary link member 160 is shaped like a pair of bars having the same length. The first base bracket 30 is formed with a first auxiliary link supporting part 35 coupled with a lower part of the first auxiliary link member 160. The second end of the first hinge axle 113 of the first link hinge part 111 is formed with the first auxiliary link combination part 115 coupled with an upper part of the first auxiliary link member 160.

The first auxiliary link supporting part 35 and the first auxiliary link combination part 115 are formed with a pair of first pin holes 36 spaced-apart from each other at a position deviated from the rotation axes of the first hinge axle 113 and the first hinge pin 63, respectively. Opposite end parts of the first auxiliary link member 160 are formed with first pin through hole 161 to be aligned with the first pin holes 36. Further, there are provided first link pins 37 to be inserted in the first pin holes 36 through the first pin through holes 161, respectively.

Thus, the first pin through hole 161 formed on the lower part of the first auxiliary link member 160 is movably coupled by using the first link pin 37 to the first auxiliary link supporting part 35 of the first base bracket 30 fastened to the base member 20. The first pin through hole 161 formed on the upper part of the first auxiliary link member 160 is movably coupled by using the first link pin 37 to the first auxiliary link combination part 115 formed on the second end of the first hinge axle 113 rotating coincidentally with the upper link member 100. Therefore, the first auxiliary link member 160 operates parallel to the lower link member 50 according to a the rotation of the lower link member 50 relative to the base member 20.

Figure 5:
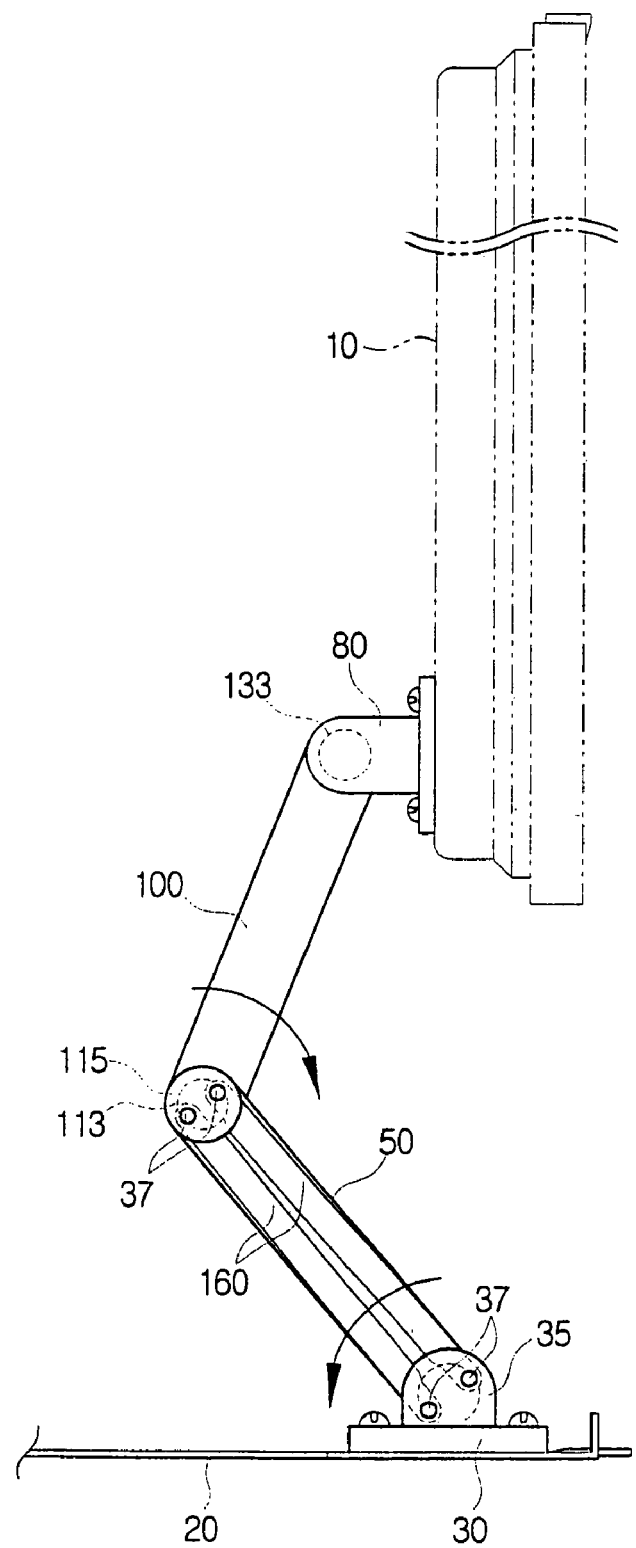
FIGS. 5 and 6 are side views illustrating operations of a first auxiliary link member in the monitor of FIG. 2.
Figure 6:
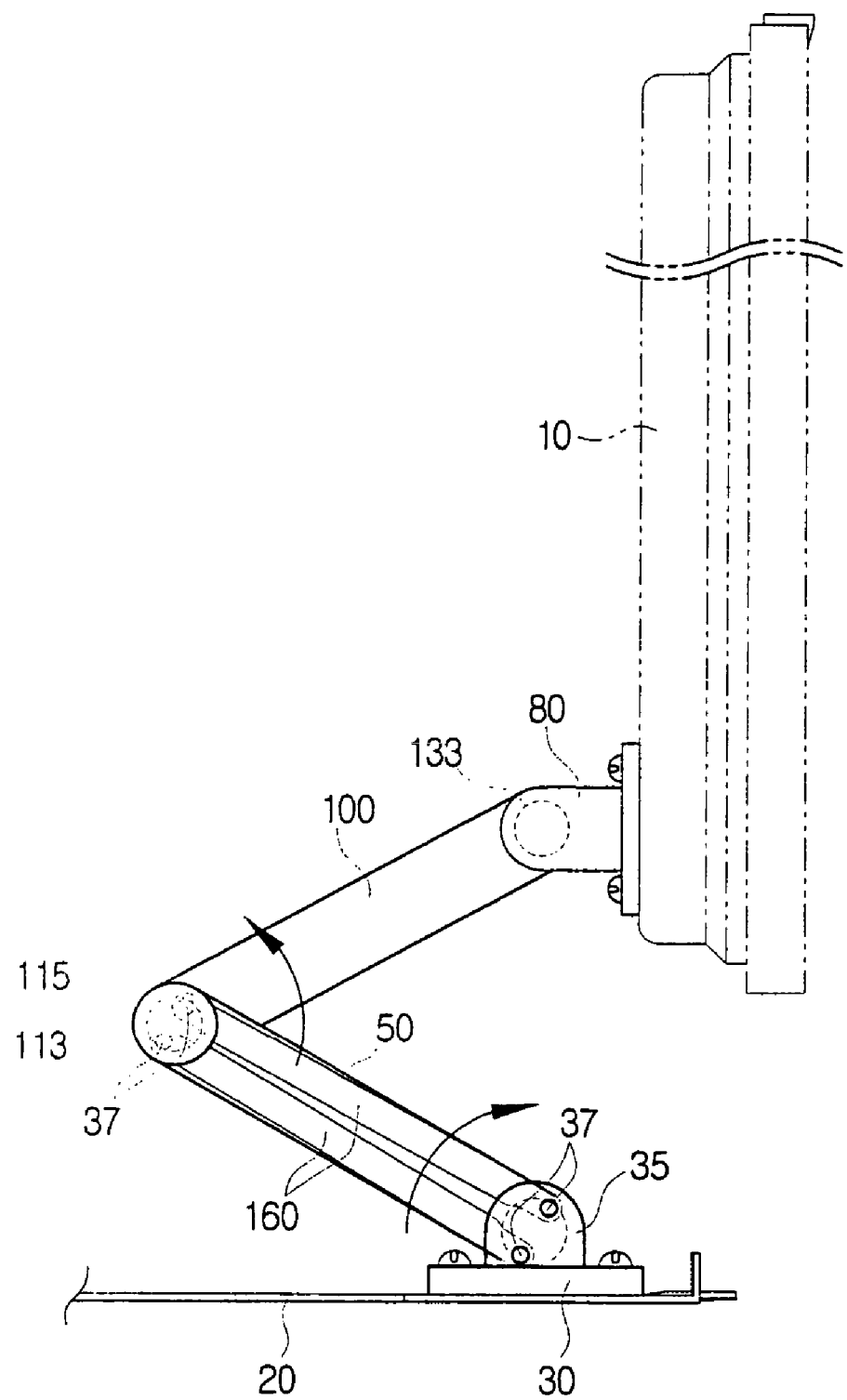

As shown in FIG. 5, when the lower link member 50 is rotated downwardly to the base member 20, the first auxiliary link combination part 115 coupled to the upper part of the first auxiliary link member 160 is rotated clockwise relative to the lower link member 50, thereby rotating the upper link member 100 downward to the lower link member 50. To the contrary, as shown in FIG. 6, when the lower link member 50 is rotated upward from the base member 20, the first auxiliary link combination part 115 coupled to the upper part of the first auxiliary link member 160 is rotated counterclockwise relative to the lower link member 50, thereby rotating the upper link member 100 upward from the lower link member 50. That is, the upper link member 100 is interlocked with the lower link member 50 by the first auxiliary link member 160.

On the other hand, the first pin through hole 161 of the lower part of the first auxiliary link member 160 is coupled to the first auxiliary link supporting part 35 at the position deviated from the rotation axis of the first hinge pin 63. The first pin through hole 161 of the upper part of the first auxiliary link member 160 is coupled to the first auxiliary link combination part 115 at the position deviated from the rotation axis of the first hinge axle 113. Here, a rotation ratio of the upper link member 100 to the lower link member 50 can be adjusted according to different deviations of the lower and upper parts of the first auxiliary link member 160 from the first hinge pin 63 and the first hinge axle 113, respectively. In this embodiment, a deviation degree of the lower part of the first auxiliary link member 160 about the first hinge pin 63 is larger than that of the upper part of the first auxiliary link member 160 about the first hinge axle 113, so that the upper link member 100 is rotated greater in proportion to the rotation of the lower link member 50. For instance, when the lower link member 50 is rotated at an angle of 90° with respect to the base member 20, the upper link member 100 is rotated at an angle of 145° with respect to the base member 20.

With this configuration, a height of the monitor main body 10 with respect to the base member 20 can be adjusted as follows. As shown in FIGS. 5 and 6, when the lower link member 50 is rotated relative to the base member 20, the upper link member 100 rotates greater than the lower link member 50 since the lower and upper link members 50, 100 are interlocked by the first auxiliary link member 160. Thus, the height of the monitor main body 10 can be easily and widely adjusted because both the lower link member 50 and the upper link member 100 are rotated. Further, because it is possible to adjust the rotation ratio of the upper link member 100 to the lower link member 50, the height of the monitor main body 10 is adjusted while a distance between a user and the monitor main body 10 is maintained constant.

The second auxiliary link member 170 forms a pair of linking members which are respectively disposed at a position deviated from rotation axes of the second hinge axle 123 of the second link hinge part 121 and the second hinge pin 73 of the second base hinge part 71 to move parallel to the lower link member 50. Further, the second auxiliary link member 170 connects the second link hinge part 121 with the base member 20, and transmits the rotary motion from the lower link member 50 relative to the base member 20 to the third auxiliary link member 175.

The second auxiliary link member 170 is shaped like a pair of bars having the same length. The second base bracket 40 is formed with a second auxiliary link supporting part 45 coupled with a lower part of the second auxiliary link member 170. The first end of the second hinge axle 123 of the second link hinge part 121 is formed with the second auxiliary link combination part 125 coupled with an upper part of the second auxiliary link member 170.

The second auxiliary link supporting part 45 and the second auxiliary link combination part 125 are formed with a pair of second pin holes 46 spaced-apart from each other at a position deviated from the rotation axes, respectively. Opposite end parts of the second auxiliary link member 170 are formed with second pin through holes 171, respectively, to be aligned with the second pin holes 46. Further, second link pins 47 are inserted in the second pin holes 46 through corresponding ones of the second pin through holes 171, respectively.

Thus, the second pin through hole 171 formed on the lower part of the second auxiliary link member 170 is movably coupled by using the second link pin 47 to the second auxiliary link supporting part 45 of the second base bracket 40 fastened to the base member 20. The second pin through hole 171 formed on the upper part of the second auxiliary link member 170 is movably coupled by using the second link pin 47 to a lower part of the second auxiliary link combination part 125 formed on the first end of the second hinge axle 123 movably coupled with a lower part of the third auxiliary link member 175. Therefore, the second auxiliary link member 170 operates parallel to the lower link member 50 according to the rotation of the lower link member 50 relative to the base member 20.

Figure 7:
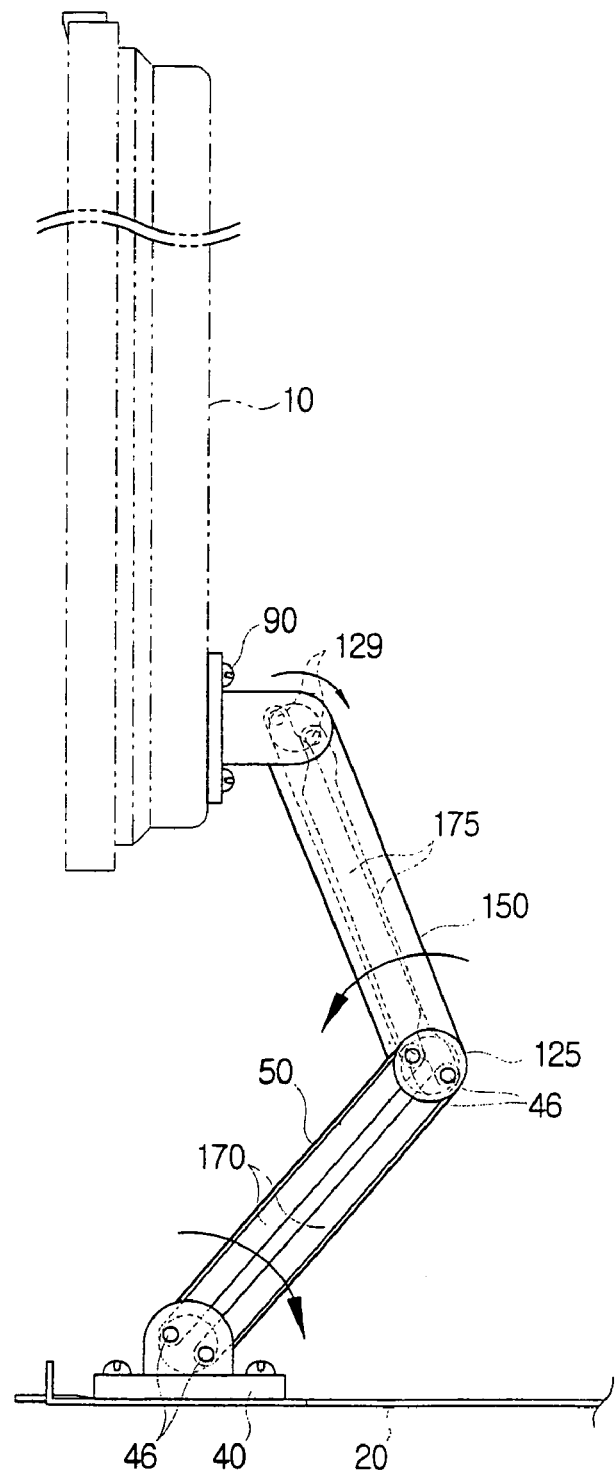
FIGS. 7 and 8 are side views illustrating operations of second and third auxiliary link members in the monitor of FIG. 2.
Figure 8:
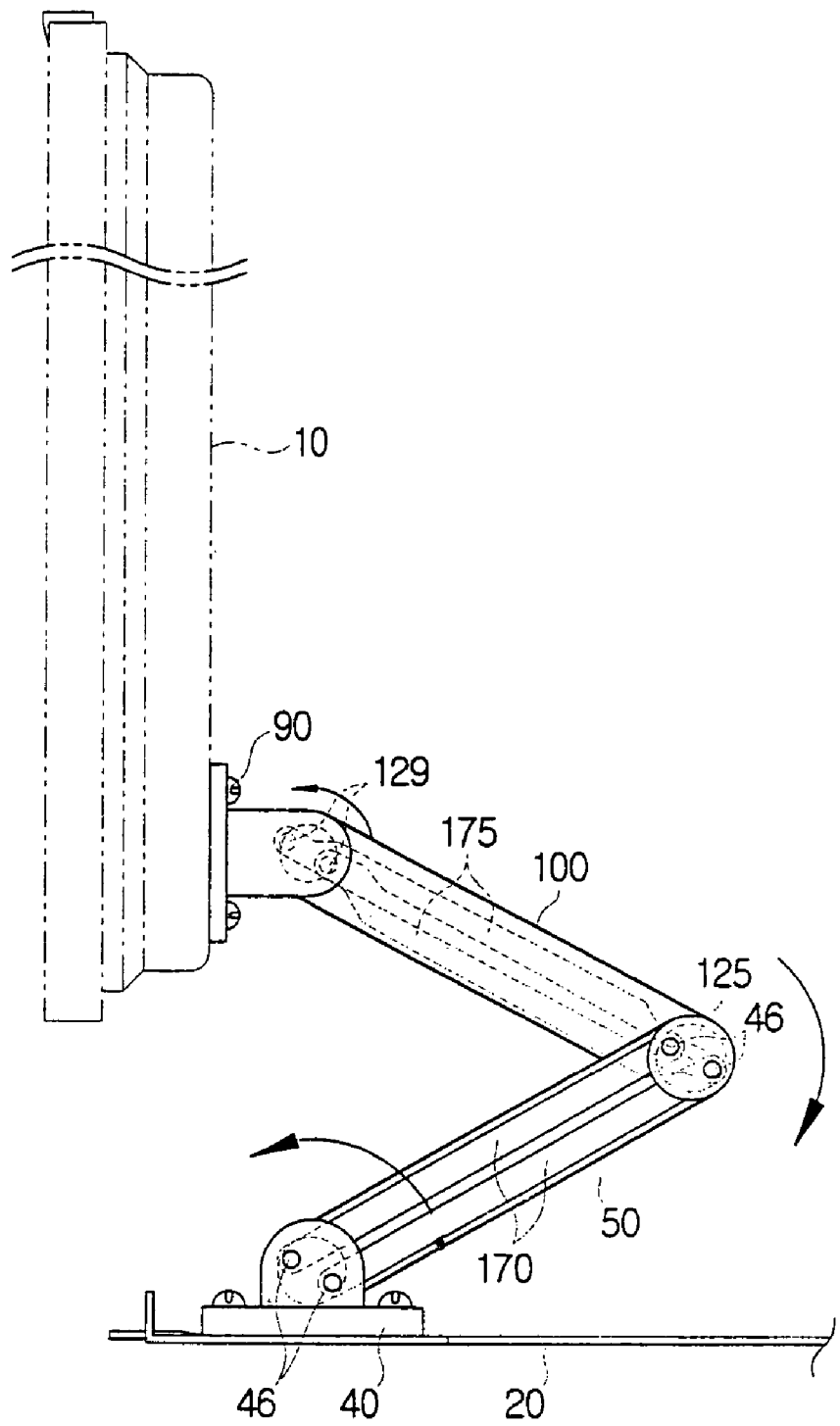

As shown in FIG. 7, when the lower link member 50 is rotated downwardly to the base member 20, the second auxiliary link combination part 125 coupled to the upper part of the second auxiliary link member 170 is rotated counter-clockwise relative to the lower link member 50, thereby rotating the second hinge axle 123 counterclockwise relative to the lower link member 50. At this time, although the lower link member 50 is rotated downwardly to the base member 20, an angle between the second hinge axle 123 and the base member 20 is kept constant because not only the second auxiliary link member 170 includes the bars having the same length but also the lower and upper parts of the second auxiliary link member 170 connected to the second auxiliary link supporting part 45 and the second auxiliary link combination part 125 are equally deviated from the rotation axes of the second hinge pin 73 and the second hinge axle 123, respectively. To the contrary, as shown in FIG. 8, when the lower link member 50 is rotated upward from the base member 20, the second hinge axle 123 having the second auxiliary link combination part 125 coupled to the upper part of the second auxiliary link member 170 is rotated clockwise relative to the lower link member 50, thereby rotating the second hinge axle 123 clockwise relative to the lower link member 50. At this time, although the lower link member 50 is rotated upwardly from the base member 20, the angle between the second hinge axle 123 and the base member 20 is kept constant. That is, the second hinge axle 123 is interlocked with the second auxiliary link member 170.

The third auxiliary link member 175 is formed with a pair of linking members which are respectively disposed at a position deviated from rotation axes of the second hinge axle 123 of the second link hinge part 121 and the fourth hinge pin 143 of the second monitor hinge part 141, to move parallel to the upper link member 100. Further, the third auxiliary link member 175 connects the second link hinge part 121 with the second monitor hinge part 141 and transmits the rotary motion from the upper link member 100 relative to the lower link member 50 to the monitor main body 10.

The third auxiliary link member 175 is shaped like a pair of bars having the same length, and disposed between the first and second link hinge parts 111 and 121 of the upper link member 100 and between the first and second monitor hinge parts 131 and 141 of the upper link member 100. The second end of the second hinge axle 123 is formed with a third auxiliary link supporting part 127 coupled with a lower part of the third auxiliary link member 175. The second end of the third hinge axle 145 is formed with the third auxiliary link combination part 147 coupled with an upper part of the third auxiliary link member 175.

The third auxiliary link supporting part 127 and the third auxiliary link combination part 147 are formed with a pair of third pin holes 128 spaced-apart from each other at a position deviated from the rotation axes, respectively. Opposite end parts of the third auxiliary link member 175 are formed with third pin through hole 171 to be aligned with the third pin holes 128. Further, third link pins 129 are inserted in the third pin holes 128 through corresponding ones of the third pin through hole 176, respectively.

Thus, the third pin through hole 176 formed in the lower part of the third auxiliary link member 175 is movably coupled by using the third link pin 129 to the third auxiliary link supporting part 127 of the second end of the second hinge axle 123. The upper part of the third auxiliary link member 175 is movably coupled by using the third link pin 129 to the third auxiliary link combination part 147 of the third hinge axle 145. Therefore, the third auxiliary link member 175 operates parallel to the upper link member 100 according to a rotation of the upper link member 100 relative to the lower link member 50.

As shown in FIG. 7, when the lower link member 50 is rotated downwardly to the base member 20, the upper link member 100 rotates downwardly to the lower link member 50 by the first auxiliary link member 160, so that the third auxiliary link combination part 147 coupled to the upper part of the third auxiliary link member 175 is rotated clockwise relative to the lower link member 50, thereby rotating the third hinge axle 145 clockwise relative to the third hinge axle accommodating part 106 of the upper link member 100. Then, a rotary motion of the third hinge axle 145 is transmitted to the second monitor bracket 90 through the fourth hinge pin 143 combined in the second monitor bracket 90 with a friction due to the second friction spring 144, thereby rotating the monitor main body 10 clockwise.

To the contrary, as shown in FIG. 8, when the lower link member 50 is rotated upwardly from the base member 20, the upper link member 100 rotates upwardly from the lower link member 50 by the first auxiliary link member 160, so that the third hinge axle 145 having the third auxiliary link combination part 147 coupled to the upper part of the third auxiliary link member 175 is rotated counterclockwise relative to the lower link member 50, thereby rotating the third hinge axle 145 counterclockwise relative to the third hinge axle accommodating part 106 of the upper link member 100. Then, the rotary motion of the third hinge axle 145 is transmitted to the fourth monitor bracket 90 through the fourth hinge pin 143, thereby rotating the monitor main body 10 counterclockwise. That is, the third hinge axle 145 is interlocked with the third auxiliary link member 175.

With this configuration, the monitor main body 10 of the monitor according to the present invention can be rotated as follows. The monitor main body 10 is rotated by the rotation of the lower link member 50 since the second auxiliary link member 170 rotates parallel to the lower link member 50, and the third auxiliary link member 175 having the lower part interlocked with the second auxiliary link member 170 and the upper part coupled to the third hinge axle 145 rotates parallel to the upper link member 100. Further, when the upper link member 100 is rotated downwardly to the lower link member 50, the monitor main body 10 rotates backward. When the upper link member 100 is rotated upwardly from the lower link member 50, the monitor main body 10 rotates forward. Here, when the height of the monitor main body 10 is adjusted, a tilting angle of the monitor main body 1.0 with respect to a line perpendicular to the base member 20 is not changed.

Figure 15A:
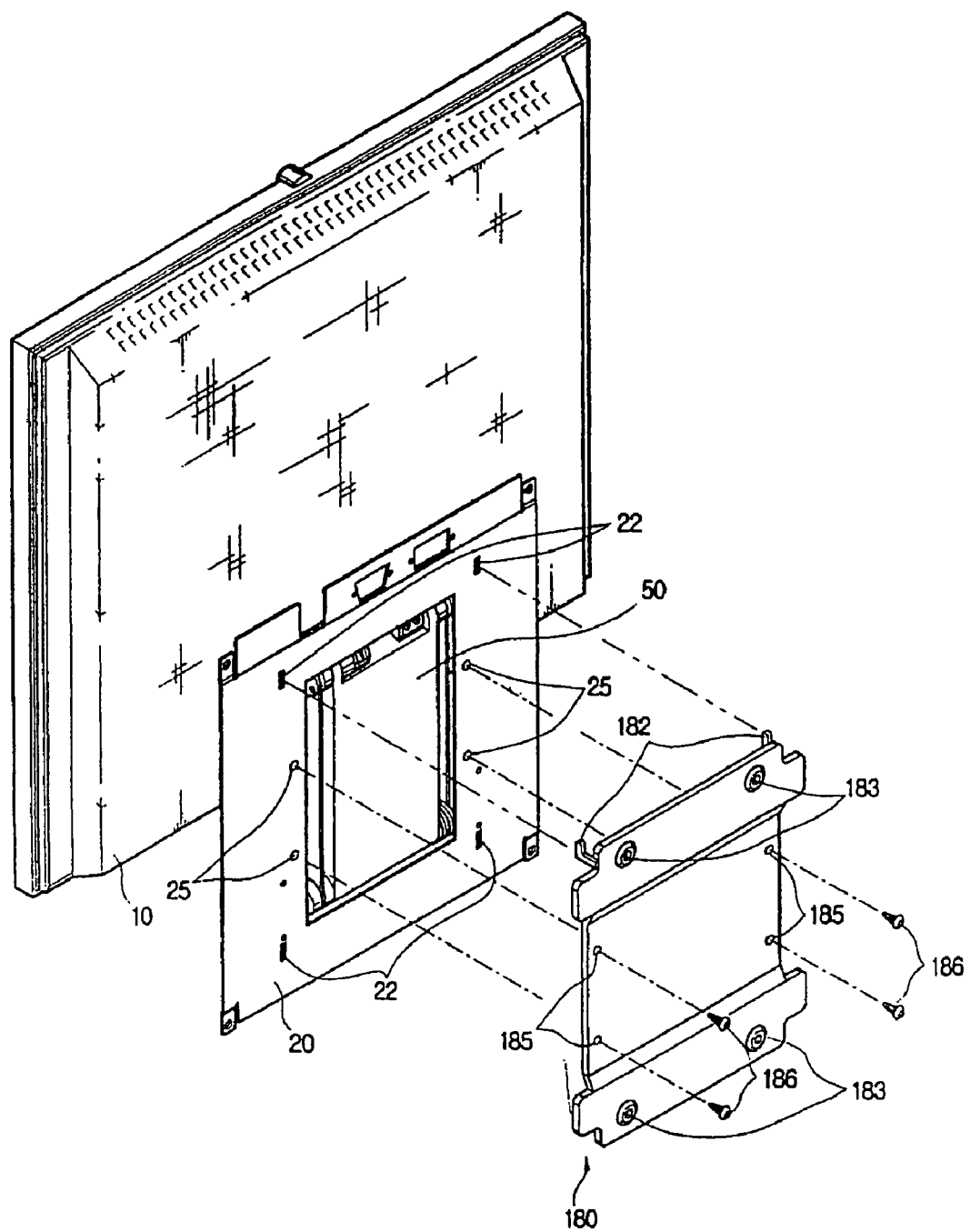
FIG. 15A is a perspective view illustrating the base member to be mounted with a base bracket in the monitor of FIG. 2.
Figure 15B:
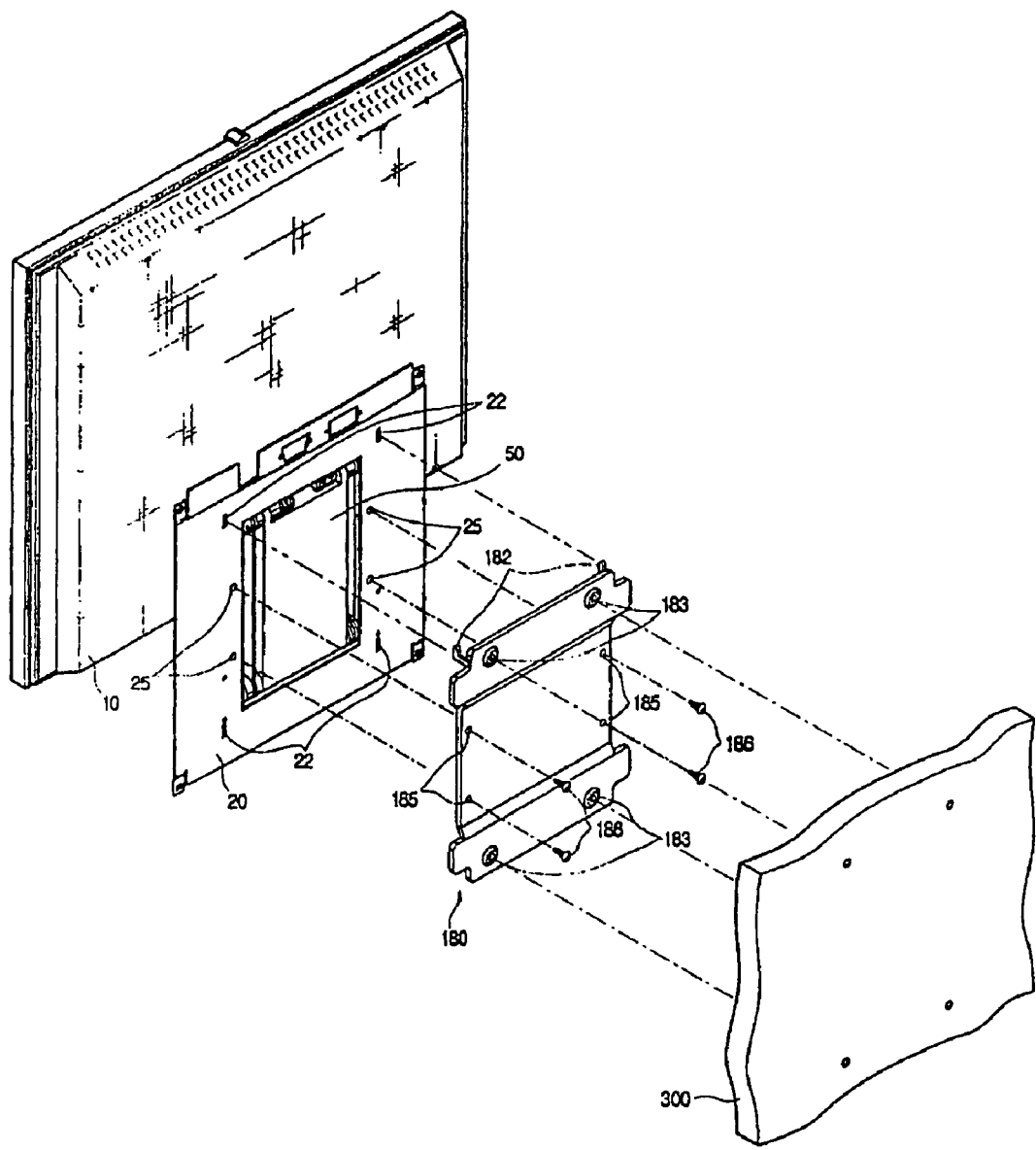
FIG. 15B is a side view illustrating the base member to be mounted to an inclined plane with a base bracket in the monitor of FIG. 2.

As shown in FIGS. 15A and 15B, the monitor according to the present invention further includes a base bracket 180 having a first side combined to a rear side of the base member 20 and a second side combined to the inclined plane such as the wall 300, etc.

The base bracket 180 includes a plurality of hooks 182 to be latched to a plurality of hook holes 22 formed on the base member 20, a plurality of first combining holes 183 allowing the base bracket 180 to be installed to the inclined plane, and a plurality of second combining holes 185 to combine the base member 20 with the base bracket 180. Further, the base member 20 is formed with a plurality of third combining holes 25 corresponding to the second combining holes 25, and is combined with the base bracket 180 by second screws 186.

Here, the second combining holes 185 of the base bracket 180 and the third combining holes 25 of the base member 20 are formed in consideration of a VESA regulation, so that the monitor can be installed to an arm stand 190 (see FIG. 16) according to the VESA regulation. Thus, the monitor can be easily installed to the inclined plane such as the wall.

Figure 16:
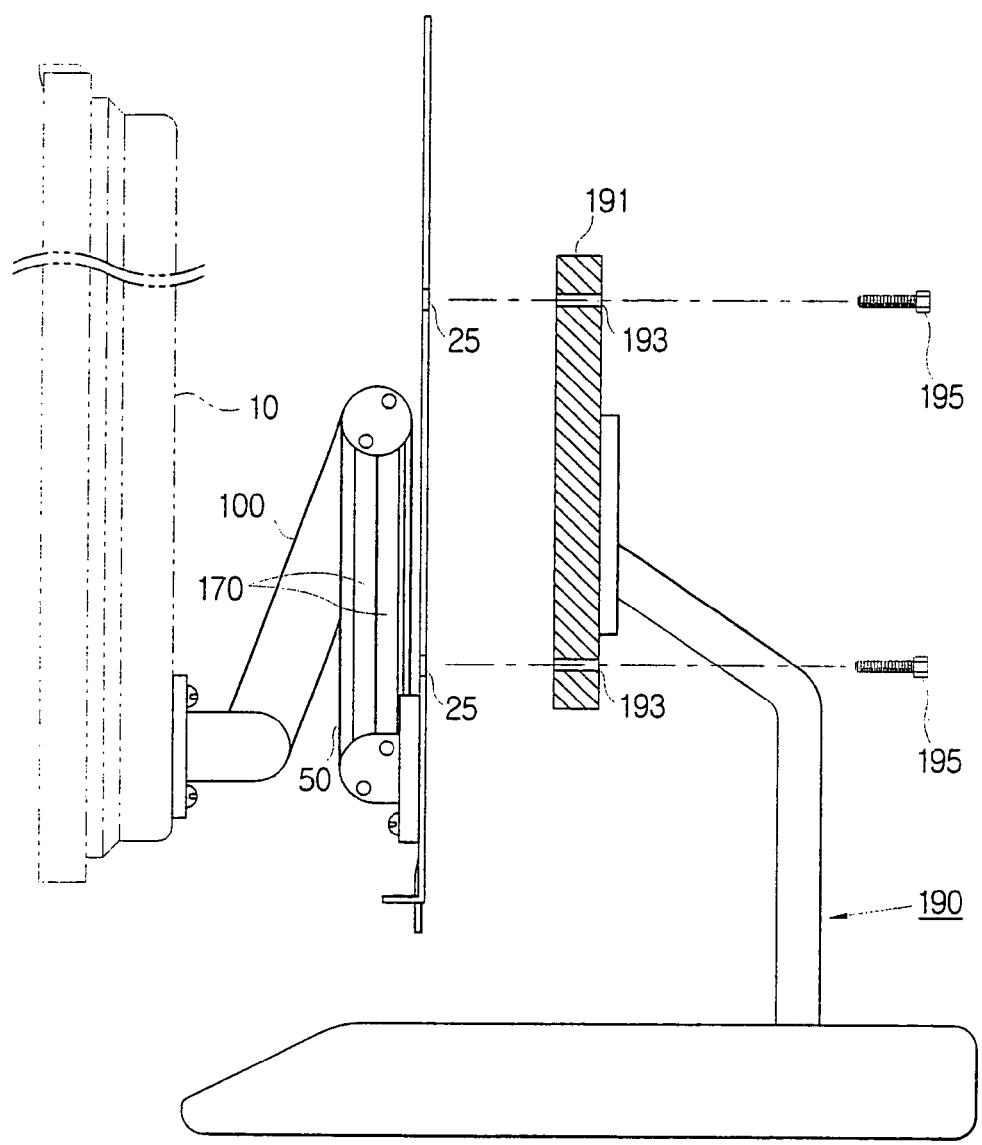
FIG. 16 is a side view illustrating an arm stand mounted with the monitor being mounted onto an arm stand of FIG. 2.

FIG. 16 is a side view of the monitor according to the present invention, which illustrates the monitor being mounted onto the arm stand. As shown in FIG. 16, the arm stand 190 includes a monitor supporting part 191 provided in an upper part thereof, and the monitor supporting part 191 is formed with a plurality of fourth combining holes 193 according to the VESA regulation. Hence, the third combining holes 25 of the base member 20 are aligned with the fourth combining holes 193 of the monitor supporting part 191, and then third screws 195 are combined to the base member 20 via to the third combining holes 25 and the fourth combining hole 193 of the monitor supporting part 191. Thus, the monitor can be easily installed onto various arm stands according to the VESA regulation.

In the foregoing embodiment, the torsion spring is provided in the first base hinge part. However, another torsion spring may be provided in at least one of the first and second monitor hinge parts and the second base hinge part.

In the foregoing embodiment, the rotation restricting part is provided in the second base hinge part. However, another rotation restricting part may be provided in the first base hinge part.

In the foregoing embodiment, the tilt restricting part is provided in the second base hinge part. However, another tilt restricting part may be provided in the first base hinge part.

In the foregoing embodiment, the first and second friction springs are provided in the first second base hinge part and the second monitor hinge part, respectively. However, other friction springs may be provided in the second base hinge part and the first monitor hinge part.

As described above, the present invention provides a monitor in which an allowable height adjustment of a monitor main body is relatively large, and costs for keeping and carrying the monitor can be decreased by decreasing a packing volume of the monitor.

Further, the present invention provides a monitor, in which a height of a monitor main body can be adjusted without changing a tilting angle of the monitor main body, and the tilting angle of the monitor main body with respect to a base member can be properly adjusted.

Further, the present invention provides a monitor, in which a base member is detachably combined with a base bracket and can be installed onto an inclined plane such as a wall, an arm stand, etc., and particularly, easily installed onto various arm stands according to the VESA regulation.

Although an embodiment of the present invention has been shown and described, it will be appreciated by those skilled in the art that changes may be made in these embodiments without departing from the principles and spirit of the invention, the scope of which is defined in the appended claims and their equivalents.

What is claimed is:

1. A monitor including a monitor main body displaying an image thereon, and a base member supporting the monitor main body, the monitor comprising:
   a base hinge coupled to the base member;
   a lower link member rotatably combined to the base hinge provided in the base member;
   a monitor hinge coupled to the monitor main body;
   an upper link member rotatably combined to the monitor hinge coupled to the monitor main body;
   a link hinge provided between the upper link member and the lower link member to allow the upper link member to rotate relative to the lower link member, and having a first and second hinge parts disposed on the same horizontal axis to rotatably connect upper opposite parts of the lower link member with lower opposite parts of the upper link member, respectively; and a first auxiliary link member disposed parallel to the lower link member at a first position deviated from first axes of the link hinge and the base hinge to connect the lower link member with the upper link member through the link hinge and transmit a rotary motion from the lower link member relative to the base member to the upper link member through the link hinge.

2. The monitor according to claim 1, further comprising:
a second auxiliary link member disposed parallel to the lower link member at a second position deviated from second axes of the link hinge and the base hinge to connect the link hinge with the base member.

3. The monitor according to claim 1, further comprising:
a base install bracket combined to the base member to install the base member onto an inclined plane, wherein the base install bracket comprises at least one hook, and the base member comprises at least one hook hole receiving the hook to latch the base bracket to detachably combine the base install bracket to the base member.

4. The monitor according to claim 3, wherein the base install bracket comprises:
at least one first combining hole to install the base install bracket to the inclined plane.

5. The monitor according to claim 4, wherein:
the base install bracket comprises,
    at least one second combining hole to be combined with the base member; and
the base member comprises,
    a third combining hole corresponding to the second combining hole.

6. The monitor according to claim 5, wherein the second combining holes of the base install bracket and the third combining hole of the base member are formed according to a VESA regulation.

7. The monitor according to claim 2, further comprising:
a third auxiliary link member disposed parallel to the upper link member at a third position deviated from third axes of the monitor hinge and the link hinge to connect the monitor hinge with the link hinge.

8. A monitor including a monitor main body displaying an image thereon, and a base member supporting the monitor main body, the monitor comprising:
a base hinge coupled to the base member;
a lower link member rotatably combined to the base hinge provided in the base member;
a monitor hinge coupled to the monitor main body;
an upper link member rotatably combined to the monitor hinge coupled to the monitor main body;
a link hinge provided between the upper link member and the lower link member to allow the upper link member to rotate relative to the lower link member;
a first auxiliary link member disposed parallel to the lower link member at a first position deviated from first axes of the link hinge and the base hinge to connect the lower link member with the upper link member through the link hinge and transmit a rotary motion from the lower link member relative to the base member to the upper link member through the link hinge; and
first and second base brackets spaced-apart from each other and combined to the base member, wherein the base hinge comprises first and second base hinge parts rotatably connecting lower opposite parts of the lower link member to the first and second base brackets, respectively.

9. The monitor according to claim 8, wherein the first base hinge part comprises:
a hinge pin formed with a first end having a circular cross section and a second end having a noncircular cross section;
a pin accommodating part formed on one of the lower opposite parts of the lower link member to accommodate the first end of the first hinge pin to be rotatable therein; and
a pin holding part formed on one side of the first base bracket and fitting the second end of the first hinge pin therein.

10. The monitor according to claim 9, wherein the first base hinge part comprises:
a friction spring disposed between the pin accommodating part and the first end of the hinge pin to resist a rotation of the hinge pin.

11. The monitor according to claim 8, wherein the first base bracket comprises:
a spring supporting part protruding from one side thereof; and
a torsion spring disposed on the spring supporting part to be elastically biased in an opposite direction to a downward rotation of the lower link member relative to the base member.

12. The monitor according to claim 8, wherein the second base hinge part comprises:
a hinge pin formed with a first end having a circular cross section and a second end having a noncircular cross section;
a pin accommodating part formed on a lower part of the lower link member to accommodate the first end of the hinge pin rotatable therein; and
a pin holding part formed on one side of the second base bracket and fitting the second end of the hinge pin therein.

13. The monitor according to claim 12, wherein the base hinge comprises:
a rotation restricting part provided at least one of the first and second base hinge parts to restrict a rotation of the lower link member relative to the base member within a predetermined angle range.

14. The monitor according to claim 13, wherein the rotation restricting part comprises:
a pair of stoppers formed by cutting a groove from one of the lower opposite parts of the lower link member around the second pin accommodating part to face each other, and
a pair of projections provided around the pin holding part formed on the side of the second base bracket to selectively stop a movement of the second base hinge part by one of the first stoppers according to a rotating direction of the lower link member.

15. The monitor according to claim 8, wherein the link hinge comprises:
first and second link hinge parts rotatably connecting upper opposite parts of the lower link member with lower opposite parts of the upper link member, respectively.

16. The monitor according to claim 15, wherein the first link hinge part comprises:
a first hinge axle combined to one of the lower opposite parts of the upper link member and one of the upper opposite parts of the lower link member to rotatably connect the one lower opposite part of the upper link member with the one upper opposite part of the lower link member;

a first axle accommodating part formed on the one upper opposite part of the lower link member to receive the first hinge axle rotatable therethrough; and a first axle holding part formed on the one lower opposite part of the upper link member and combined with a first end of the first hinge axle to rotate coincidentally with the upper link member.

17. The monitor according to claim 16, wherein the second link hinge part comprises:

a second hinge axle combined to the other one of the lower opposite parts of the upper link member and the other one of the upper opposite parts of the lower link member to rotatably connect the other lower opposite part of the upper link member with the other upper opposite part of the lower link member;

a second axle accommodating part formed on the other upper opposite part of the lower link member to receive the second hinge axle rotatable therethrough; and a second axle combining part formed on the other lower opposite part of the upper link member to receive the second hinge axle rotatable therethrough.

18. The monitor according to claim 17, further comprising: first and second monitor brackets spaced from each other and combined to the monitor main body, wherein the monitor hinge comprises first and second monitor hinge parts rotatably connecting the upper opposite parts of the upper link member to the first and second monitor brackets, respectively.

19. The monitor according to claim 18, wherein the first monitor hinge part comprises:

a hinge pin formed with a first end having a circular cross section and a second end having a noncircular cross section;

a pin accommodating part formed on one side of the first monitor bracket to receive the first end of the hinge pin rotatable therein; and a pin holding part formed in the one upper opposite part of the upper link member and fitting the second end of the hinge pin therein.

20. The monitor according to claim 18, wherein the second monitor hinge part includes:

a hinge pin formed with a first end having a circular cross section and a second end having a noncircular cross section;

a pin accommodating part formed on one side of the second monitor bracket to receive the first end of the hinge pin to be rotatable therein;

a third hinge axle fitting the second end of the fourth hinge pin therein and rotating coincidentally with the hinge pin; and a third hinge axle accommodating part formed on the other upper opposite part of the upper link member to receive the third hinge axle to be rotatable therethrough.

21. The monitor according to claim 20, wherein the second monitor hinge part comprises:

a friction spring disposed between the fourth pin accommodating part and the first end of the fourth hinge pin to resist a rotation of the fourth hinge pin.

22. The monitor according to claim 20, wherein the monitor hinge comprises:

a tilting restricting part provided on at least one of the first and second monitor hinge parts to restrict a tilt of the monitor main body relative to the upper link member within a predetermined angle range.

23. The monitor according to claim 22, wherein the tilt restricting part comprises:

a tilt restricting washer having a matching hole matching the second end of the fourth hinge pin, and a pair of stoppers protruding from a circumference thereof at a predetermined distance from each other; and a flat spring combined to one side of the fourth monitor bracket, rotatable between the stoppers of the tilt restricting washer coincidentally with the monitor main body, and restricting the tilt of the monitor main body relative to the upper link member within a predetermined angle range.

24. The monitor according to claim 23, wherein the flat spring comprises:

an elastic projection part disposed between the stoppers of the tilt restricting washer.

25. The monitor according to claim 24, wherein the elastic projection part of the flat spring is deformed to pass at least one of the stoppers of the tilt restricting washer.

26. The monitor according to claim 20, further comprising a second auxiliary link member disposed parallel to the lower link member at a second position deviated from second axes of the link hinge and the base hinge to connect the link hinge with the base member, wherein the second auxiliary link member comprises,
a pair of linking members coupled between the second base bracket and the link hinge; and
the second base bracket comprises,
a second auxiliary link supporting part coupled with a lower part of the second auxiliary link member, and the first end of the second hinge axle formed with the second auxiliary link combination part coupled with an upper part of the second auxiliary link member.

27. The monitor according to claim 26, wherein:
the second auxiliary link supporting part and the second auxiliary link combination part comprise,
a pair of second pin holes spaced from each other at a predetermined distance; and
the second auxiliary link member comprises,
opposite end parts formed with second pin through hole to be aligned with the second pin holes, and second link pins inserted in the second pin holes through the second pin through holes.

28. The monitor according to claim 26, further comprising a third auxiliary link member disposed parallel to the upper link member at a third position deviated from third axes of the monitor hinge and the link hinge to connect the monitor hinge with the link hinge, wherein the third auxiliary link member comprises,
a pair of linking members; and
the second end of the second hinge axle comprises,
a third auxiliary link supporting part coupled with a lower part of the third auxiliary link member, and the second end of the third hinge axle formed with the third auxiliary link combination part coupled with an upper part of the third auxiliary link member.

29. The monitor according to claim 28, wherein:
the third auxiliary link supporting part and the third auxiliary link combination part comprise,
a pair of third pin holes spaced-apart from each other at a predetermined distance; and
the third auxiliary link member comprises,
opposite end parts formed with third pin through hole to be aligned with the third pin holes, and third link pins inserted in the third pin holes through the third pin through hole.

30. The monitor according to claim 17, wherein:
the first auxiliary link member comprises,
    a pair of linking members coupled between the first base bracket and the link hinge; and
the first base bracket comprises,
    a first auxiliary link supporting part coupled with a lower part of the first auxiliary link member, and the second end of the first hinge axle of the first link hinge part formed with the first auxiliary link combination part coupled with an upper part of the first auxiliary link member.

31. The monitor according to claim 30, wherein:
the first auxiliary link supporting part and the first auxiliary link combination part comprise,
    a pair of pin holes spaced-apart from each other at a predetermined distance;
the first auxiliary link member comprises,
    opposite end parts formed with a pin through hole to be aligned with the pin holes; and
the first base bracket comprises,
    link pins inserted in the first pin holes through the first pin through holes.

32. A monitor including a monitor main body displaying a picture thereon and a base member supporting the monitor main body, the monitor comprising:
    a lower link member rotatably combined with the base member;
    an upper link member rotatably combined with the monitor main body;
    a link hinge rotatably coupled between the upper link member and the lower link member to move the monitor main body with respect to the base member, wherein the monitor main body forms a main angle with the base member and is moved to be parallel to the base member according to movements of the lower and upper link members;
    a first auxiliary link member having one end rotatably coupled to the base member and another end rotatably coupled to the upper link member; and
    a rotation restricting part restricting a rotation of the lower link member relative to the base member within a predetermined angle range,
    wherein the first auxiliary link member is disposed on a line parallel to a center line passing through axes of the link hinge and the base hinge.

33. The monitor according to claim 32, wherein the first auxiliary link member comprises:
    a plurality of link members disposed on lines parallel to the center line passing through axes of the link hinge and the base hinge.

34. The monitor according to claim 33, wherein the link members of the first auxiliary link member are disposed to be parallel to each other when the upper and lower link members are moved with respect to the base member.

35. The monitor according to claim 34, wherein the link members of the first auxiliary link member are disposed to be parallel to the lower link member when the monitor main body moves with respect to the base member.

36. A monitor including a monitor main body displaying a picture thereon and a base member supporting the monitor main body, the monitor comprising:
    a lower link member rotatably combined with the base member;
    an upper link member rotatably combined with the monitor main body;
    a link hinge rotatably coupled between the upper link member and the lower link member to move the monitor main body with respect to the base member, wherein the monitor main body forms a main angle with the base member and is moved to be parallel to the base member according to movements of the lower and upper link members;
    a first auxiliary link member having one end rotatably coupled to the base member and another end rotatably coupled to the upper link member;
    a rotation restricting part restricting a rotation of the lower link member relative to the base member within a predetermined angle range; and
    a second auxiliary link member having one end rotatably coupled to the base member and another end rotatably coupled to the link hinge,
    wherein the second auxiliary link member is disposed on a line parallel to a center line passing through an axis of the link hinge.

37. A monitor including a monitor main body displaying a picture thereon and a base member supporting the monitor main body, the monitor comprising:
    a lower link member rotatably combined with the base member;
    an upper link member rotatably combined with the monitor main body;
    a link hinge rotatably coupled between the upper link member and the lower link member to move the monitor main body with respect to the base member, wherein the monitor main body forms a main angle with the base member and is moved to be parallel to the base member according to movements of the lower and upper link members;
    a first auxiliary link member having one end rotatably coupled to the base member and another end rotatably coupled to the upper link member;
    a rotation restricting part restricting a rotation of the lower link member relative to the base member within a predetermined angle range;
    a second auxiliary link member having one end rotatably coupled to the base member and another end rotatably coupled to the link hinge; and
    a third auxiliary link member having one end rotatably coupled to the monitor main body and another end rotatably coupled to the link hinge,
    wherein the third auxiliary link member is disposed on a line parallel to a center line passing through an axis of the link hinge.

38. A monitor including a monitor main body displaying an image thereon, and a base member supporting the monitor main body, the monitor comprising:
    a base hinge coupled to the base member;
    a lower link member rotatably combined to the base hinge provided in the base member;
    a monitor hinge coupled to the monitor main body;
    an upper link member rotatably combined to the monitor hinge coupled to the monitor main body;
    a link hinge provided between the upper link member and the lower link member to allow the upper link member to rotate relative to the lower link member;
    a lower auxiliary link member having one end rotatably coupled to the base member and another end rotatably coupled to the upper link member to transmit a rotary motion from the lower link member relative to the base member to the upper link member through the link hinge; and an upper auxiliary link member having one end rotatably coupled to the link hinge and another end rotatably coupled to the monitor main body to interlock with the lower auxiliary link member through the link hinge and transmit a rotary motion from the upper link member relative to the lower link member to the monitor main body through the link hinge.

39. The monitor according to claim 38, wherein the link hinge comprises a first and second hinge parts disposed on the same axis to rotatably connect upper opposite parts of the lower link member with lower opposite parts of the upper link member, respectively.

* * * * *